US007555029B2

(12) United States Patent
Kondo

(10) Patent No.: US 7,555,029 B2
(45) Date of Patent: Jun. 30, 2009

(54) METHOD FOR DECODING A PLURALITY OF STANDARD RADIO WAVES AND STANDARD RADIO WAVE RECEIVER

(75) Inventor: Takayuki Kondo, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 616 days.

(21) Appl. No.: 11/288,439

(22) Filed: Nov. 29, 2005

(65) Prior Publication Data

US 2006/0140282 A1 Jun. 29, 2006

(30) Foreign Application Priority Data

Nov. 29, 2004 (JP) ............................ 2004-343869

(51) Int. Cl.
*H04B 14/04* (2006.01)

(52) U.S. Cl. ....................... 375/130; 375/324; 375/242; 370/319; 370/320; 370/321; 342/150; 342/151; 342/152; 342/153; 342/154; 333/193; 333/194; 333/195; 333/196

(58) Field of Classification Search ................ 375/324, 375/130; 370/319, 320, 321; 342/150, 151, 342/152, 153, 154, 155; 333/193, 194, 195, 333/196
See application file for complete search history.

(56) References Cited

U.S. PATENT DOCUMENTS 5,347,546 A * 9/1994 Abadi et al. ................ 375/316
2005/0141600 A1* 6/2005 Nomura et al. ............. 375/211

FOREIGN PATENT DOCUMENTS

JP 06-258364 9/1994

(Continued)

OTHER PUBLICATIONS

European Search Report dated Nov. 16, 2006 Application No. EP 05 11 1306.

(Continued)

*Primary Examiner*—Shuwang Liu
*Assistant Examiner*—Helene Tayong
(74) *Attorney, Agent, or Firm*—Studebaker & Brackett PC; Donald R. Studebaker

(57) ABSTRACT

A method and a standard radio wave receiver for receiving a plurality of standard radio waves respectively having signal configurations in accordance with respective specifications which define carrier channels and formats and for decoding time code signals carried by the standard radio waves. The method extracts at least part of a bit waveform common to the specifications as a extracted signal from a waveform of each of the time code signals given by each of the carrier channels, synchronizes bits to each of the time code signals in accordance with the extracted signal, determines an evaluation index indicating good or bad of a reception condition for each of the carrier channels from the bit waveform, and selects a single channel from the carrier channels in accordance with the evaluation index. The method further extracts a bit waveform corresponding to a characteristic code which characterizes the format which differs in each specifications from the time code signal of the selected channel, discriminates the specification of the time code signal given by the channel in accordance with the contents of the characteristic code, and decodes the time code signal to time data in accordance with the format of the discriminated specification.

11 Claims, 24 Drawing Sheets

FOREIGN PATENT DOCUMENTS

| | | |
|---|---|---|
| JP | 06-258460 | 9/1994 |
| JP | 2001-108770 | 4/2001 |
| JP | 2002-296374 | 10/2002 |
| JP | 2003-222687 | 8/2003 |
| JP | 2003-279676 | 10/2003 |
| JP | 2004-004136 | 1/2004 |
| JP | 2004-198289 | 7/2004 |
| JP | 2004-317139 | 11/2004 |
| WO | WO-2005/109120 | 11/2005 |

OTHER PUBLICATIONS

Official Action for Japanese Patent Application No. 2004-343869, translated Aug. 6, 2008 (Full Translation).

* cited by examiner

CODE CONFIGURATION OF TCO SIGNAL FOR 1 FRAME (60 SECONDS)

STATISTIC BIT SYNCHRONIZATION METHOD (JJY)

STATISTIC BIT SYNCHRONIZATION METHOD (DCF77)

STATISTIC BIT SYNCHRONIZATION METHOD (WWVB)

FIG. 6F

−6dBμV/m

| | ADJACENT DIFFERENCE SUMMATION |
|---|---|
| No.1 | 27.0 |
| No.2 | 19.0 |
| No.3 | 17.0 |
| No.4 | 20.0 |
| No.5 | 27.0 |
| No.6 | 20.0 |
| No.7 | 26.0 |
| No.8 | 11.0 |
| No.9 | 20.0 |
| No.10 | 20.0 |
| MINIMUM | 11.0 |
| AVERAGED | 20.7 |
| MAXIMUM | 27.0 |

−3dBμV/m

| | ADJACENT DIFFERENCE SUMMATION |
|---|---|
| No.1 | 10.0 |
| No.2 | 8.0 |
| No.3 | 11.0 |
| No.4 | 3.0 |
| No.5 | 5.0 |
| No.6 | 17.0 |
| No.7 | 3.0 |
| No.8 | 8.0 |
| No.9 | 7.0 |
| No.10 | 8.0 |
| MINIMUM | 3.0 |
| AVERAGED | 8.0 |
| MAXIMUM | 17.0 |

0dBμV/m

| | ADJACENT DIFFERENCE SUMMATION |
|---|---|
| No.1 | 1.0 |
| No.2 | 0.0 |
| No.3 | 0.0 |
| No.4 | 1.0 |
| No.5 | 0.0 |
| No.6 | 2.0 |
| No.7 | 0.0 |
| No.8 | 2.0 |
| No.9 | 3.0 |
| No.10 | 2.0 |
| MINIMUM | 0.0 |
| AVERAGED | 1.1 |
| MAXIMUM | 3.0 |

| | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 |
|---|---|---|---|---|---|---|---|---|---|---|---|---|---|---|---|---|---|---|---|---|---|---|---|
| | 3FC | 3FC | 300 | 3FC | 3C0 | 3FC | 3FC | 3FC | 3C0 | 3FC | 3FC | 3FC | 300 | 300 | 3FC | 3C0 | 3FC | 3FC | 3C0 | 3FC | 3FC | 3FC | 300 |
| | 3FC | 3FC | 300 | 3FC | 3C0 | 3FC | 3FC | 3FC | 3C0 | 3FC | 3FC | 3FC | 300 | 300 | 3FC | 3C0 | 3FC | 3FC | 3C0 | 3FC | 3FC | 3C0 | 300 |
| | 3FC | 3FC | 300 | 3FC | 3C0 | 3FC | 3FC | 3FC | 3C0 | 3FC | 3FC | 3FC | 300 | 300 | 3FC | 3C0 | 3C0 | 3FC | 3FC | 3FC | 3FC | 3FC | 300 |
| | 3FC | 3FC | 300 | 3FC | 3C0 | 3FC | 3FC | 3FC | 3C0 | 3FC | 3FC | 3FC | 300 | 300 | 3FC | 3C0 | 3C0 | 3FC | 3FC | 3FC | 3FC | 3C0 | 300 |

METHOD FOR DECODING A PLURALITY OF STANDARD RADIO WAVES AND STANDARD RADIO WAVE RECEIVER

BACKGOUND OF THE INVENTION

1. Field of the Invention

The present invention relates to a method for receiving a plurality of standard radio waves defined under specifications in Japan and other countries and for decoding time code signals in the respective standard radio waves, the time code signals respectively having various carriers and formats in accordance with the respective specifications. The present invention also relates to a standard radio wave receiver to process time data from the time code signals.

In this description, the term "format" is used as meaning that the waveform format for each of the bit codes constituting a time code signal (hereinafter called a TCO signal) and a data format for defining a sequence of time codes which is information provided by the TCO signal.

2. Description of the Related Art

The standard radio wave (hereinafter called JJY) informing a user of Japan Standard Time is always broadcast on the low frequency waves of 40 kHz and 60 kHz from two stations, Kyushu radio station and Fukushima radio station, which are operated and managed by the National Institute of Information and Communications Technology (NICT). The carrier waves of the standard radio wave are modulated by the TCO signal which is generated with a bit rate of 1 bit/sec. The TCO signal has a configuration in which a frame of 60 bits is sequentially repeated every one minute. Each frame involves time data including year, month, day, hour and minute in the notation format of a BCD (Binary Coded Decimal) code (refer to FIG. 1A).

Each of one-bit codes constituting a TCO signal in JJY represents any one of a binary 1 code representing a binary digit "1", a binary 0 code representing a binary digit "0", and a marker code (shown "MK" for the sake of convenience) which is a synchronization signal for indicating a separation of time information. In that sense, it should be noted that the term "bit" is differently used from the usual meaning in the description. Such three codes are distinguished by the differences among their H widths in a rectangular pulse (refer to FIG. 1B). Japanese Patent Kokai H06-258460 and Japanese Patent Kokai 2001-108770 refer to the techniques utilizing the standard radio wave from JJY.

As regarding other countries, DCF77 (77.5 kHz) in Germany, WWVB (60 kHz) in the U.S.A, MSF (60 kHz) in England, and so on are cited in low frequency standard waves in service (refer to FIG. 1). Their details can be referred on respective homepages from respective standard radio wave stations in their respective countries. Among the specifications of the standard radio waves of the respective countries, many different points are cited, such as differences in carrier frequencies provided by respective broadcast stations, differences in respective data formats for one minute (refer to FIG. 1A), and a difference in respective wave format of a TCO signals for one second constituting one bit are different (refer to FIG. 1B). In addition, some specification may have special attributes, such as summer time, leap year, and leap second.

At present, many wave clocks which can correspond to a plurality of specifications manually switch processes depending on the format in accordance with the specification of the standard radio wave to be received. This has resulted from the fact that there are many differences among those formats and that it is thus difficult to automatically select a format due to a throughput or a processing time. However, requests for automatically selecting a format are increased in response to the recent globalization.

There are various problems to be overcome in realizing an automatic selection of format. For example, regarding a frequency channel selection, if a wave clock is used within Japan and a frequency channel of 40/60 kHz from JJY is selected, a decoder does not need to recognize whether 40 kHz or 60 kHz is used but it is enough to select a one with higher quality of reception. Thus, the design for a frequency channel selection circuit including its antenna has a degree of freedom and it is easy to develop a circuit with high sensitivity. On the other hand, if a wave clock corresponds to various types of formats, it is required to select carrier frequencies according to the respective formats. Thus, it is required for a decoder to recognize which frequency is received. The channel selection circuit may frequently have any limitation in design so that hardware circuits are respectively provided for the respective standard radio waves.

There is another problem that there is a fluctuation of time required to successfully receive a frequency. If an automatic selection of format is achieved by using a usual approach, a reception is started, for example, by assuming DCF77 in Germany and selecting the receiving channel of 77.5 kHz. Then, if the reception is successful, it is determined that the format is DCF77. On the contrary, if the reception of DCF77 is failed, it selects the channel of 60 kHz to start the reception of MSF. If the reception is successful, it is determined that the format is of MSF. In this way, the reception and code decoding are sequentially performed for the assumed formats of the respective countries. In such a way, big differences occur between the time in which the first DCF77 in Germany is successfully received and the time in which the last, for example, JJY 40 kHz is successfully received. For this reason, it is required to set priorities for areas where they are used and shorten a receiving time. Moreover, as each of the formats is needed to be sequentially checked, there is a disadvantage that it takes a long time to determine that all were failed in reception and thus consumes more current.

There is a further problem that it is unable to receive a standard radio wave under the best conditions. For example, in France located midway between German and Britain, if the reception is performed by using the automatic selection of format, the probability of selecting DCF77 becomes high when the reception of DCF77 in Germany is preceded. In some places, even if MSF reception in England can be received in better condition, DCF77 is selected and thus the standard radio wave which is not under the best condition may be received. To avoid such phenomena, it is considered to select the best format after all formats have been received. However, as different evaluation indexes of the reception condition are used for the formats, the reception cannot be properly evaluated. This is also a problem.

SUMMARY OF THE INVENTION

The present invention is intended to solve the above problems. The object of the invention is to provide a method and a standard radio frequency receiver for automatically selecting a standard radio wave of a channel in a better condition at a less processing load and in a less processing time and for decoding the selected standard radio wave according to the specification of the format of the selected standard radio wave.

One aspect of the present invention is a decoding method for receiving a plurality of standard radio waves respectively having signal configurations in accordance with respective specifications which define carrier channels and formats and for decoding time code signals carried by said standard radio waves. The decoding method comprises a bit synchronizing step to extract at least part of a bit waveform common to said specifications as a extracted signal from a waveform of each of said time code signals given by each of said carrier channels, and to synchronize bits to each of said time code signals in accordance with said extracted signal, a channel selection step to determine an evaluation index indicating good or bad of a reception condition for each of said carrier channels from said bit waveform, and to select a single channel from said carrier channels in accordance with said evaluation index, a specification discrimination step to extract a bit waveform corresponding to a characteristic code which characterizes said format different in each of said specifications from said time code signal of said selected channel, and to discriminate said specification of said time code signal given by said channel in accordance with the contents of said characteristic code, and a decoding step to decode said time code signal to time data in accordance with the format of said discriminated specification.

One aspect of the present invention is a standard radio wave receiver for receiving a plurality of standard radio waves respectively having signal configurations in accordance with respective specifications which define carrier channels and formats and for decoding time code signals carried by said standard radio waves. The standard radio wave receiver comprises bit synchronizing means to extract at least part of a bit waveform common to said specifications as a extracted signal from a waveform of each of said time code signals given by each of said carrier channels, and to synchronize bits to each of said time code signals in accordance with said extracted signal, channel selection means to determine an evaluation index indicating good or bad of a reception condition for each of said carrier channels from said bit waveform, and to select a single channel from said carrier channels in accordance with said evaluation index, specification discrimination means to extract a bit waveform corresponding to a characteristic code which characterizes said format different in each of said specifications from said time code signal of said selected channel, and to discriminate said specification of said time code signal given by said channel in accordance with the contents of said characteristic code, and decoding means to decode said time code signal to time data in accordance with the format of said discriminated specification.

One aspect of the present invention is a standard radio wave receiving circuit for receiving a plurality of standard radio waves respectively having signal configurations in accordance with respective specifications which define carrier channels and formats and for decoding time code signals carried by said standard radio waves. The standard radio wave receiving circuit comprises a bit synchronizing part to extract at least part of a bit waveform common to said specifications as a extracted signal from a waveform of each of said time code signals given by each of said carrier channels, and to synchronize bits to each of said time code signals in accordance with said extracted signal, a channel selection part to determine an evaluation index indicating good or bad of a reception condition for each of said carrier channels from said bit waveform, and to select a single channel from said carrier channels in accordance with said evaluation index, a specification discrimination part to extract a bit waveform corresponding to a characteristic code which characterizes said format different in each of said specifications from said time code signal of said selected channel, and to discriminate said specification of said time code signal given by said channel in accordance with the contents of said characteristic code; and a decoding part to decode said time code signal to time data in accordance with the format of said discriminated specification.

BRIEF DESCRIPTION OF THE DRAWINGS

FIG. 6F is a table showing values of adjacent difference summation in different relative field intensity.

DETAILED DESCRIPTION OF THE PREFFERED EMBODIMEMTS

Some embodiments of the present invention are described in detail referring to the attached drawings.

Figure 2:
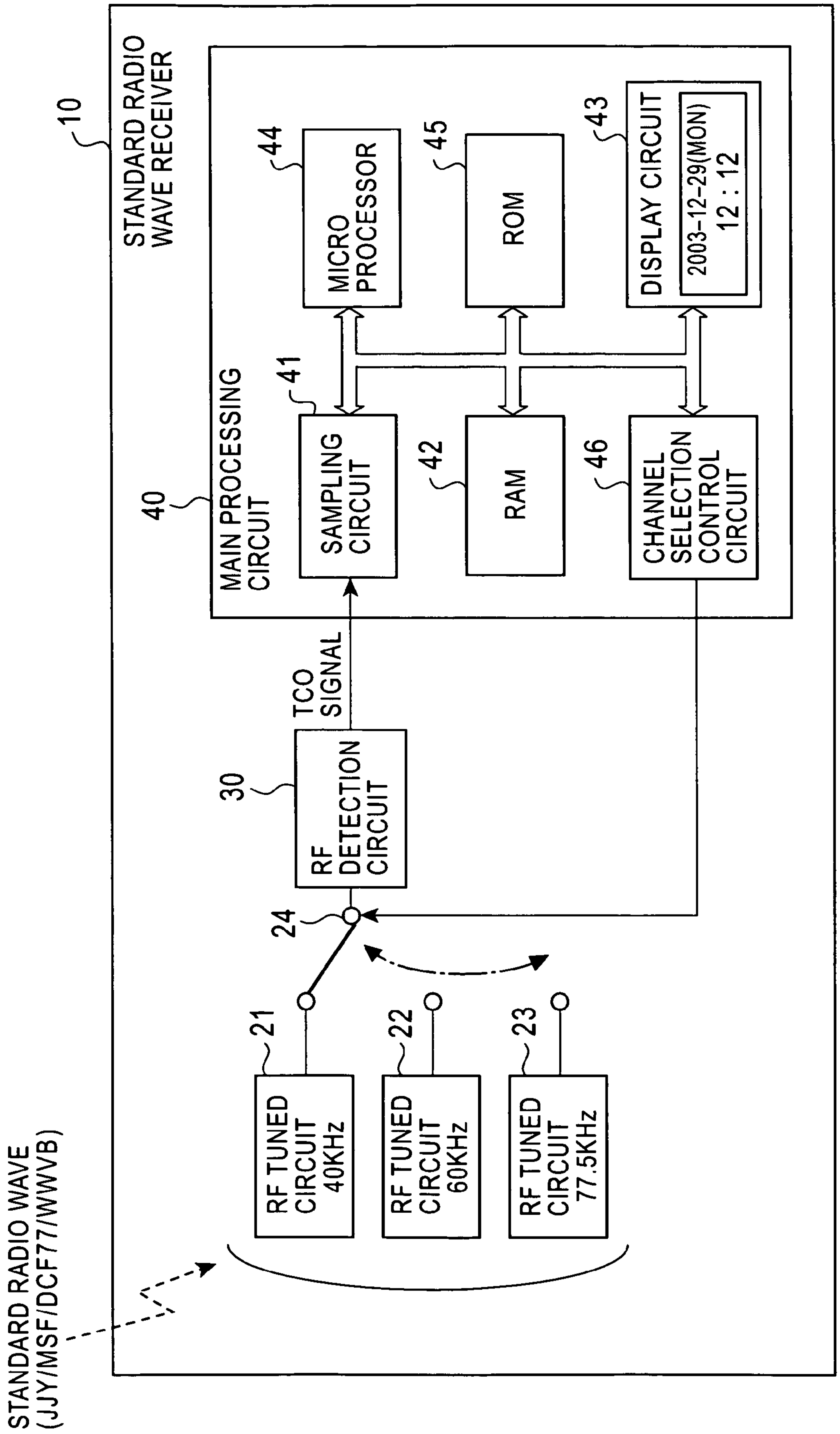
FIG. 2 shows an embodiment of the present invention, which is a block diagram of a configuration of a standard radio wave receiver.

FIG. 2 is an embodiment of the present invention, which shows a whole configuration of a standard radio wave receiver. The standard radio wave receiver achieves the decoding method of the present invention. Referring to the figure, a standard radio wave receiver 10 comprises a plurality of RF tuned circuits 21 to 23, a carrier frequency switching circuit 24, an RF detection circuit 30, and a main processing circuit 40. The standard radio wave receiver 10 can be, for example, equipment, such as a wave clock, which corrects a displayed time according to time data from a standard radio wave. Moreover, all or a part (for example, the main processing circuit 40) of the standard radio wave receiver 10 can be achieved by an integrated circuit which is formed by a single chip.

The plurality of RF tuned circuits 21 to 23 are circuits which respectively synchronize with three standard radio waves respectively having carrier frequencies of 40 kHz, 60 kHz and 77.5 kHz. In the present embodiment, four types of standard radio waves, i.e., DCF77 in German, WWVB in the U.S.A., MSF in England and JJY in Japan are assumed to be used as standard radio waves (refer to Table 1). Each of these standard radio waves has a signal configuration according to their specifications which define a carrier channel and a format. The present invention is not limited to applying such four specifications, but can apply five or more specifications of standard radio waves. The multiple RF tuning circuits 21 to 23 respectively synchronize with the carrier frequencies of these standard radio waves to provide a synchronizing signal to the RF detection circuit 30 according to a selection by the carrier frequency switching circuit 24. The RF detection circuit 30 amplifies and detects the synchronizing signal of the single standard radio wave selected by the carrier frequency switching circuit 24 and extracts a TCO signal carried by the standard radio wave to provides it to the main processing circuit 40.

TABLE 1

| Carrier frequency | MSF | DCF77 | WWVB | JJY 40k | JJY 60k |
|---|---|---|---|---|---|
| 40 kHz | | | | ◎ | |
| 60 kHz | ◎ | | ◎ | | ◎ |
| 77.5 kHz | | ◎ | | | |

The main processing circuit 40 comprises a sampling circuit 41, a random access memory (RAM) 42, a microprocessor 44, a read only memory (ROM) 45, a display circuit 43, and a channel selection control circuit 46. These parts are connected by a common bus. The sampling circuit 41 processes a TCO signal into digital information. The sampling circuit 41 samples a TCO signal which is an analog signal at a sampling rate of, for example, 50 ms and outputs sampling data which is a digital signal. The RAM 42 stores the sampling data as well as a result calculated by the micro processing unit 44 for the sampling data.

The micro processing unit 44 performs a channel selection process and a format discrimination process according to a bit synchronization and a signal quality evaluation for the sampling data, and carries out an operation of a bit decoding and a frame decoding in accordance with the format of the discriminated standard radio wave to restore time data such as year, month, day, hour and minute included in the TCO signal. The ROM 45 stores programs for a channel selection and a format discrimination processes and a arithmetic program for operating such as a bit decoding and a frame decoding. The display circuit 43 displays the restored time data by using a display element such as a LED or a liquid crystal display. The channel selection control circuit 46 controls a channel selecting operation by the carrier frequency switching circuit 24 with instructions given by the channel selection process in the micro processing unit 44.

Figure 3:
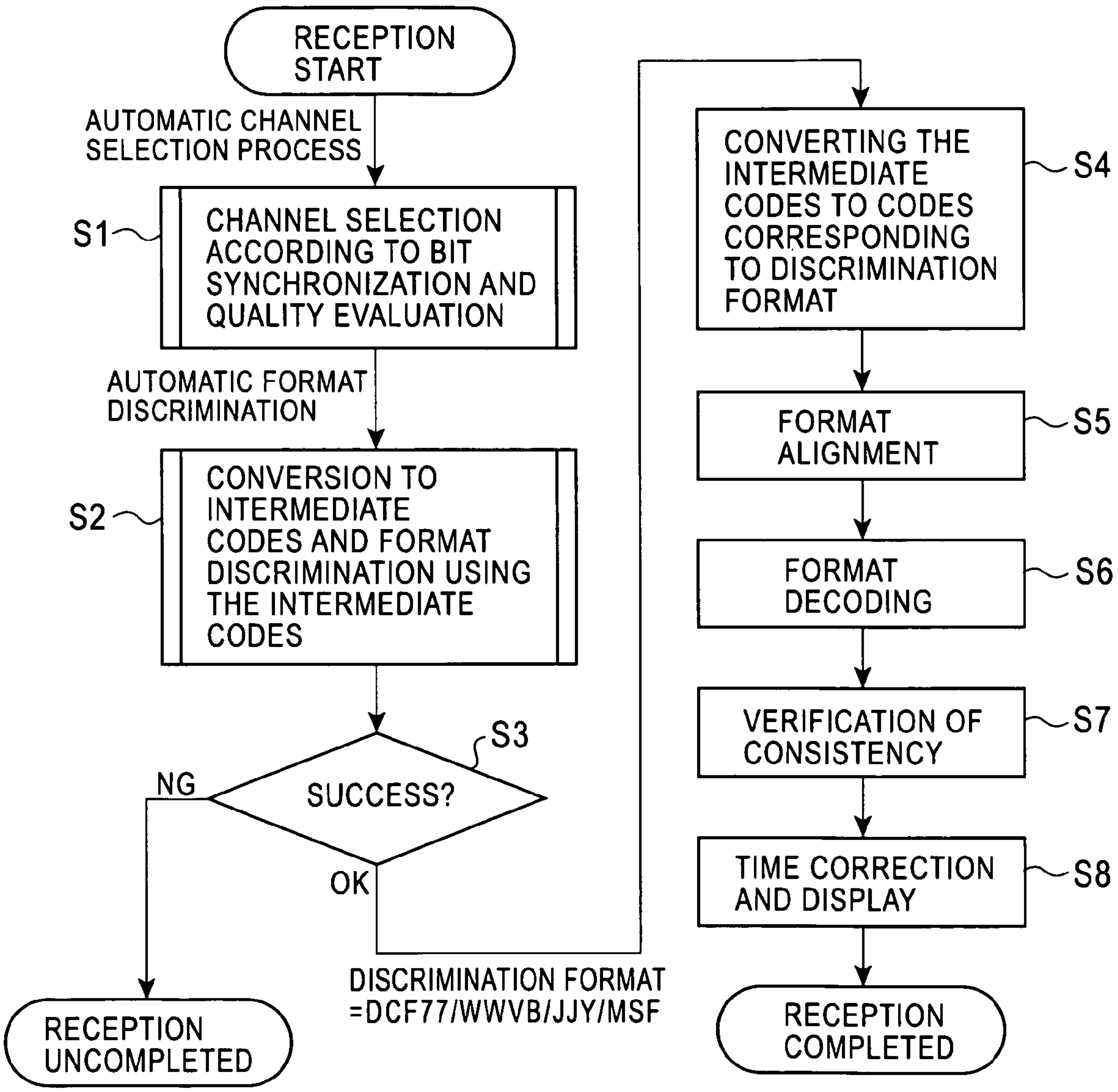
FIG. 3 is a flow chart showing a processing procedure executed in the standard radio wave receiver shown in FIG. 2.

FIG. 3 shows the whole processing procedures in the standard radio wave receiver shown in FIG. 2. As such processing procedures are mainly performed by the micro processor 44 of the main processing circuit 40 shown in FIG. 2, the components shown in FIG. 2 will be accordingly referred in the following explanation.

First, a channel selection according to the bit synchronization and the quality evaluation is performed (step S1). The standard radio wave receiver 10 sequentially selects channels from the three carrier frequencies of 40 kHz, 60 kHz and 77.5 kHz and synchronizes with and detects the respective carrier frequencies to obtain TCO signals for respective channels. Then, the TCO signal is sampled from the decoding starting point to store H/Ls of a waveform on the RAM 42. In this embodiment, the sampling period is set to 50 msec, and the sampling rate is 20 sample/sec. The sampled TCO signal is divided for every one second to be listed. Here, listing means that the segments of a TCO signal divided for one second makes a list-like multiple layers, for example, five layers which correspond to five seconds. A longitudinal convolution addition of the sampled data in the list can give twenty added values for 50 msec in columns. The statistic bit synchronization for the added values can give a bit synchronization. The detail of the statistic bit synchronization will be explained later regarding four different standard radio waves, i.e., DCF77 in Germany, WWVB in the U.S.A., MSF in England, and JJY in Japan (refer to FIGS. 4A to 4D).

The obtained columns of the added values for the bit synchronization are evaluated on quality by a method capable of evaluating qualities properly for various types of the standard radio waves to obtain an evaluation index. The details of the quality evaluation method will be explained later (refer to FIGS. 6A to 6G). A single channel with the most excellent evaluation in the obtained index is selected. As another way for obtaining an evaluation index, the reception is effected for a given length of time to measure in the given length of time an incidence of error which is used as an index of the reception condition, and a low incidence of error is determined to be excellent in the reception condition.

Then, a bit-decoding, conversion into an intermediate code, and format discrimination by using the intermediate code are performed for the TCO signal of the selected channel (Step S2). The conversion into the intermediate code enables a decoding without depending on formats so as to meet various types of formats. In addition, it enables a proper decoding even if a defect factor such as a noise and a fluctuation of the TCO waveform occurs. The format discrimination is effected by discriminating a characteristic of each format such as a difference of a marker code value and its appearance period. Then, the success or failure of the format discrimination is judged (Step S3). When the characteristic corresponding to any of formats cannot be obtained and the discrimination is failed (NG), the process results in an incomplete reception. It is conceivable that the standard radio wave receiver 10 may display a message such as "unreceivable" as a responding process.

Meanwhile, when the format is successfully discriminated (OK), the intermediate code is converted into the code corresponding to the discriminated format (Step S4). In the example of DCF77, regarding the correspondence of the intermediate code to the format code, "03FF", "03FE", and "03FC" respectively correspond to a marker, binary 0, and a binary 1 (refer to FIG. 7C). In accordance with this correspondence, the intermediate code is converted into the code corresponding to the format. Then, the format alignment is effected (Step S5). The obtained code sequence is thereby aligned to respective items of time data constituting a frame based on a marker position.

The standard radio wave JJY, for example, has position markers every 10 seconds, and those position markers can be detected. The detection of the position marker is started from the detection starting point to detect a marker ("MK") according to the result of the bit decoding. When the marker is detected at the detection starting point, a bit counting is then started. If the bit which is behind by 10 bits (10 seconds) from the marker at the detection starting point is a marker, the marker at the detection starting point is recognized as a position marker from this matching and then determined to be the position marker. After the detection of the position marker is completed, the adjustment marker which is the beginning bit of a time code is detected. The detection of the adjustment bit is effected by checking if the bit data following the position marker is a marker. Adjustment markers are sequentially detected by determining if the bit data following position markers by 10 seconds are adjustment markers. The frame of the time code of JJY which is repeated every one minutes is determined by the detection of the adjustment markers.

Next, a format decoding is executed (Step S6). As the determination of a frame gives the beginning of the time code, the bit data is divided into segments respectively corresponding to minute, hour, number of days starting on the specified date to convert them into effective data representing minute, hour, day, date, month, year and so on, which are adaptable for the frame format.

Then, a verification of the consistency is executed (Step S7). The consistency among the values of data items such as time, day, a day of the week, month and year, is verified as in a usual wave clock, and the standard time is obtained. The time data resulting from the format decoding may usually include an error except the case in which a transmission condition is good and thus no garbled bit occurs. For this reason, a plurality of time data are collected to detect an error from the contexts among the collected data. This verification is executed until accurate time information can be obtained for all items. For example, when a marker is included at an impossible position, it is assumed that an error has occurred. Then, the data including the marker is removed to execute the verification of the consistency.

Next, the display time in the display circuit 43 is adjusted to the standard time through the verification of the consistency to be displayed (Step S8). According to the above processing procedure, the received data is effectively converted to allow the use in the time verification and a time adjustment in the minimum time, even if the data is received with the formats of the standard radio waves such as DCF77 in German, WWVB in the U.S.A., MSF in Britain, and JJY in Japan having various specifications. As an conventional automatic format discrimination has sequentially performed a format analysis and then determined the consistency, it has the following disadvantages; a format discrimination takes a time; times to discriminating formats are not even according to an analysis order; and an achievement of the reception takes a time because a decoding procedure starts after the format analysis has completed. The aspects of the present embodiments overcome those problems.

In the followings, the details of the statistic bit synchronization in four standard radio waves, namely DCF77 in German, WWVB in the U.S.A., MSF in Britain, and JJY in Japan, are explained. It is assumed here that the TCO signal of each standard radio wave is sampled in common at a sampling rate of 50 msec, and that sampling data is obtained at a frequency of 20 bits/sec.

Figure 4A:
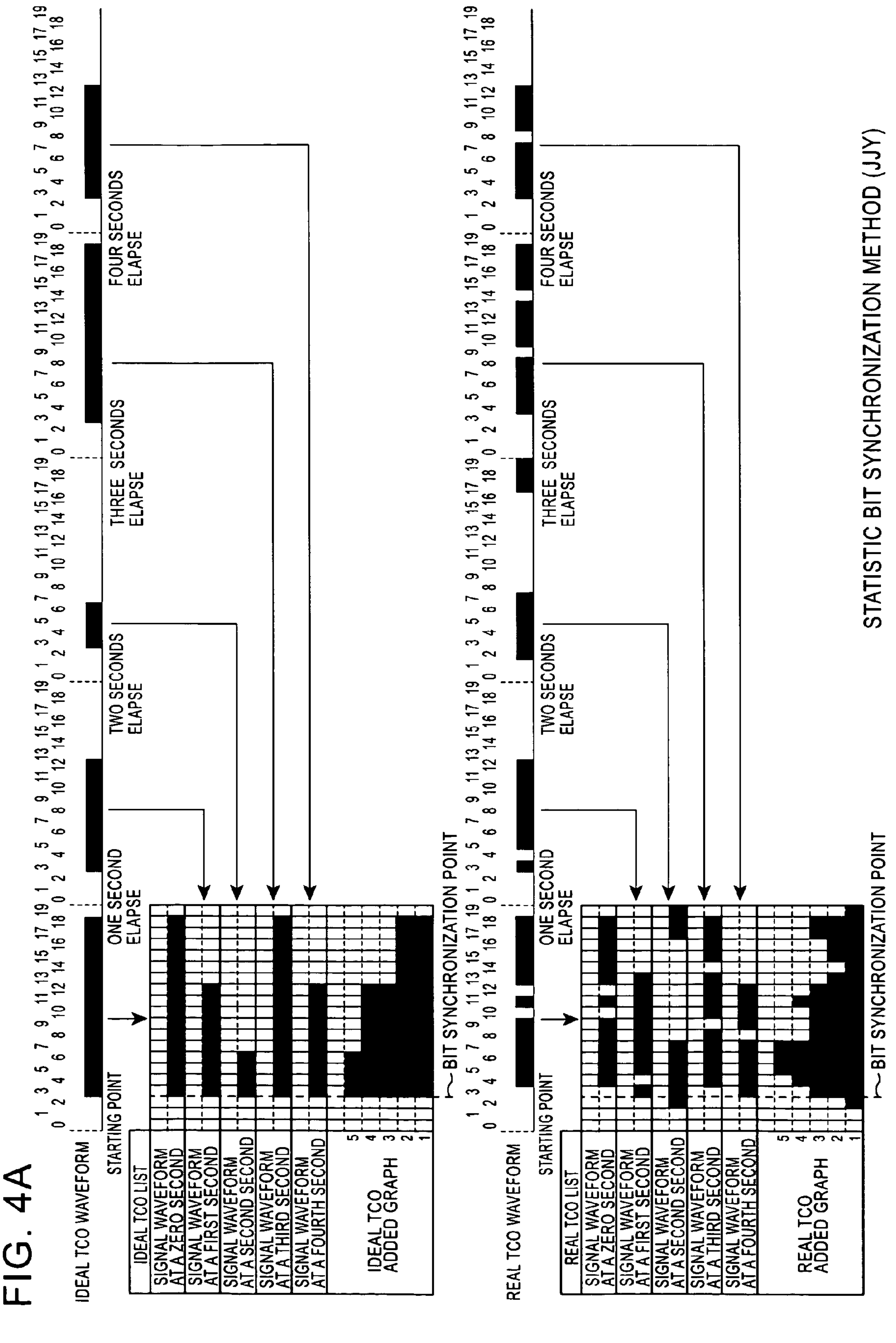
FIG. 4A explains a method of statistic bit synchronization for the standard radio wave JJY.

FIG. 4A illustrates a method of a statistic bit synchronization for the standard radio wave JJY. Referring to the upper part of the figure, the ideal TCO signal shows the change from "L" to "H" at the bit synchronization point in any code of a binary 0/a binary 1/a marker. To clarify this bit synchronization point, sampling points for every 50 msec are added longitudinally in the listed sampling data. The added data is shown as "an ideal TCO added graph". In this graph, all sampling data during 0.2 seconds (=four samples) from the synchronization point represents "H", the sampling data during 0.5 seconds (=ten samples) represents an addition of binary 0 and binary 1 data, and the further sampling data until 0.8 seconds (=sixteen samples) represents an addition of binary 0 data. This makes a step-like graph. Even if a marker/binary 0/binary 1 is differently distributed, the synchronization starting point has a change of the minimum value zero to the maximum value 5. This changing point can be set to the synchronization point.

Next, referring to the lower part of the figure, there is an example in which the above procedure is conducted in the real wave form including a noise mixing and a deformation of a wave form. Compared with the ideal wave form, the real wave form includes a spike or a fluctuation in an edge signal. If the real TCO signal is listed in the similar manner as the ideal TCO signal, it has a deformation of the waveform compared with the waveform of the ideal TCO signal. However, if the real TCO signal has a deformation of the wave form, it is admitted that L changes to H at the starting point of the code and that the minimum value increases to the maximum value. The rising edge from the minimum value to the maximum value is set to be a bit synchronization point.

In the above-mentioned method, by means of the common property of TCO signals, the starting point of a bit synchronization can be statistically extracted from a plurality of codes. In the present embodiment, a bit synchronization is obtained from sampling data of the TCO signal by five times (for five seconds). It is not to say if the sampling number becomes large, the synchronization accuracy is improved. In addition, it is understood that the method can be applied to formats other than JJY.

Figure 1A:
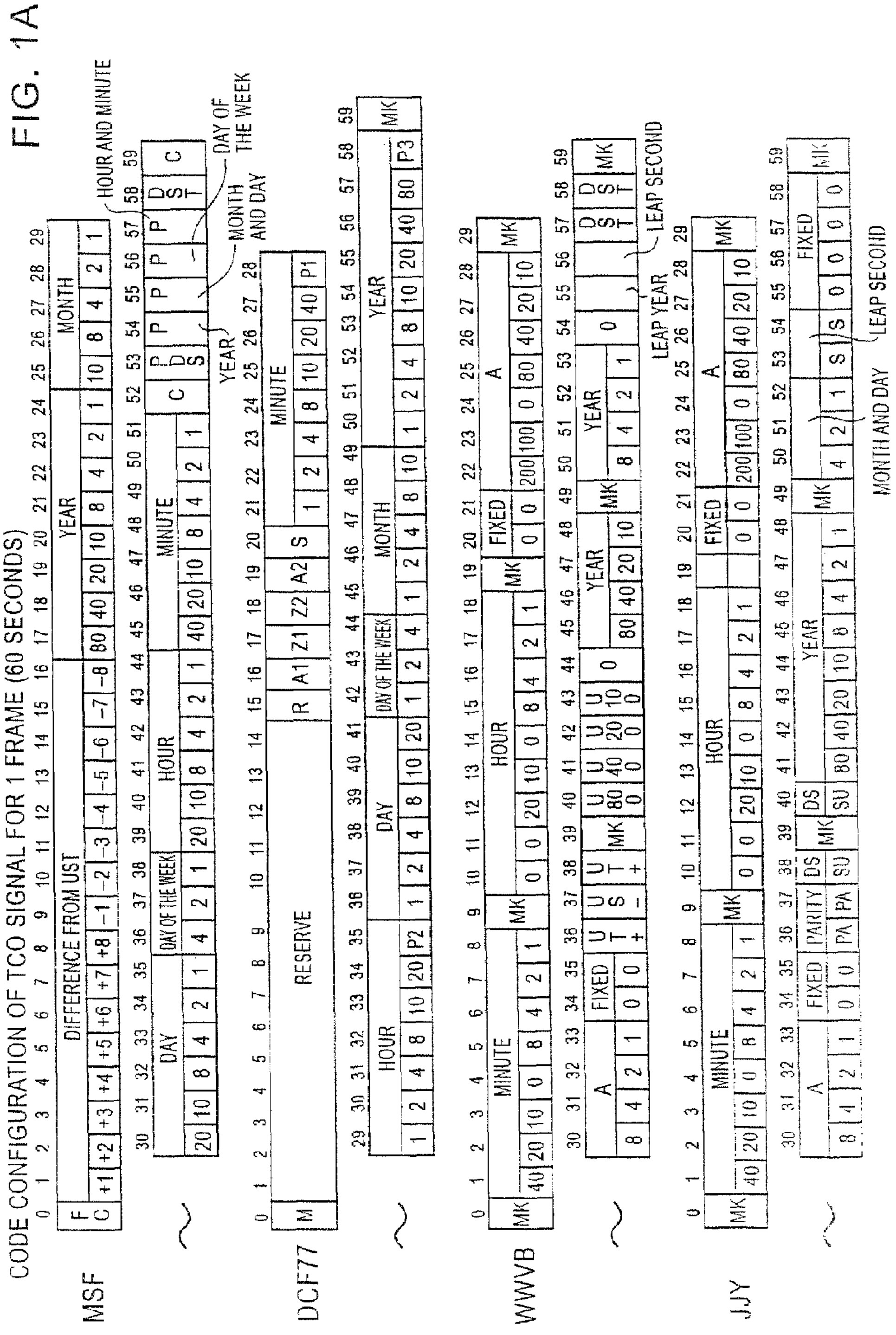
FIG. 1A PRIOR ART
FIG. 1A is a format diagram showing data formats which respectively define data arrangements of time data in four types of standard radio waves.
Figure 1B:
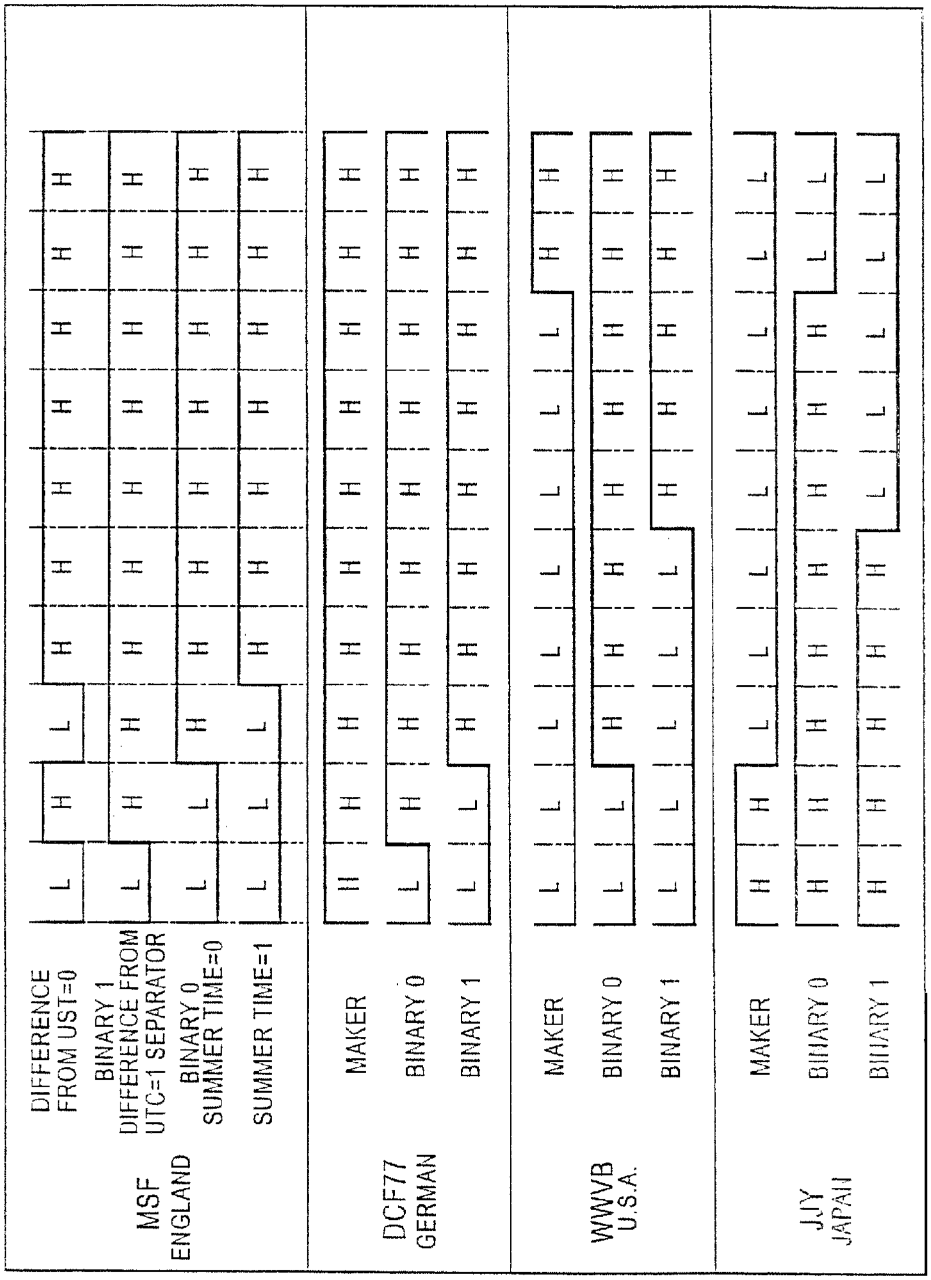
PRIOR ART FIG. 1B
FIG. 1B is a diagram illustrating wave formats of bit codes in respective four formats shown in FIG. 1A.
Figure 4B:
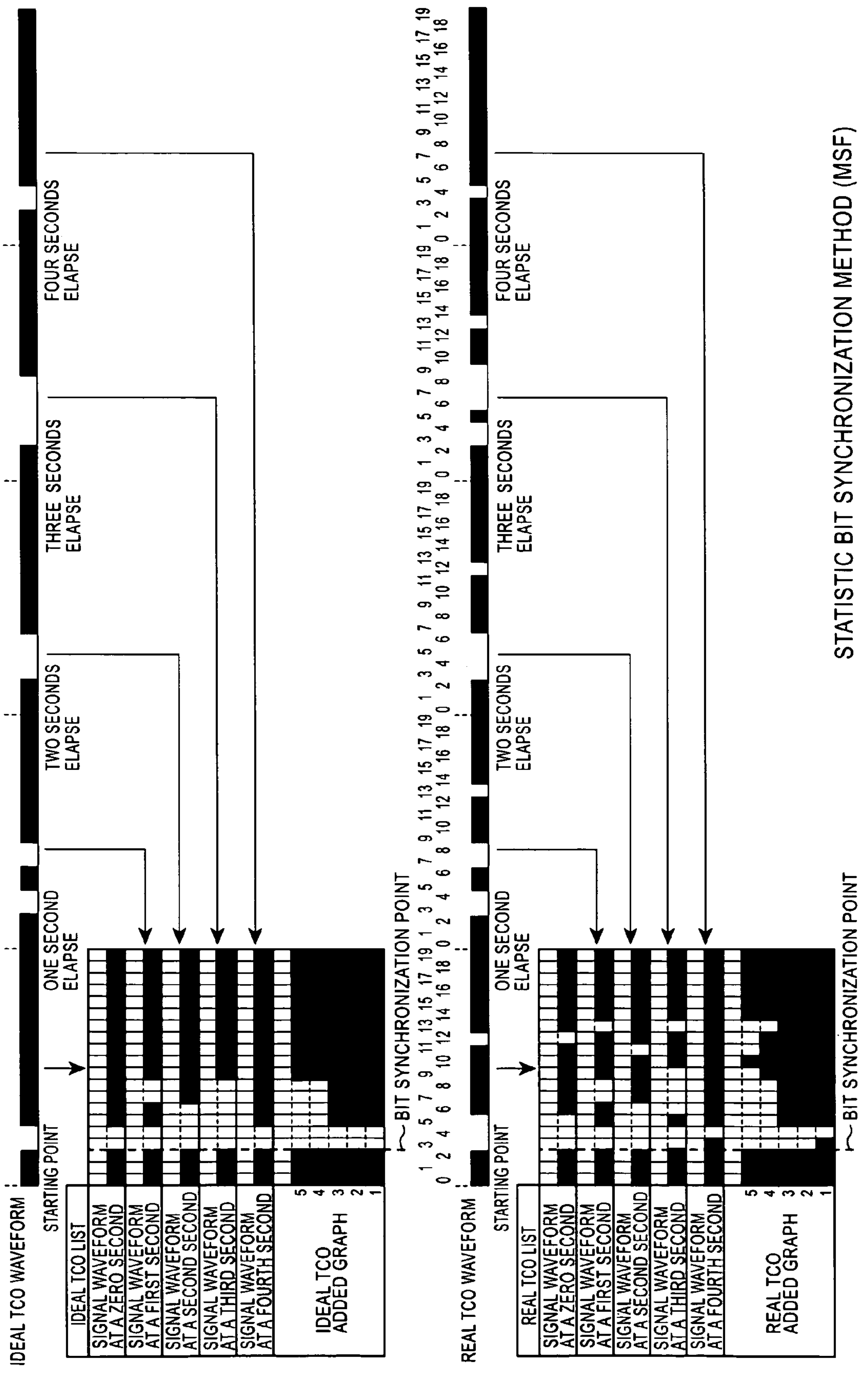
FIG. 4B explains a method of statistic bit synchronization for the standard radio wave MSF.

FIG. 4B illustrates a method of a statistic bit synchronization for the standard radio wave MSF. Referring to the figure, all of the waveform format of MSF have "L" periods for more than 100 msec at respective bit synchronization points except for the Fast Code ("FC" in FIG. 1A). For this reason, the added data changes from the maximum value 5 to the minimum value zero at the bit synchronization point. This changing point can be set to the starting point of synchronization. The Fast Code is a signal which varies every 25 msec. If the Fast Code is sampled at rate of 50 msec as this embodiment, the signal cannot be followed by sampling so that the signal is identified as a noise. However, the influence of noise can be ignored, because the appearance frequency of the Fast Code is low and one-sixties of the other codes. The real waveform to which the noise is included changes uniformly from the maximum value to the minimum value at the bit synchronization point. This comes to a detection of a falling edge which is reverse case from JJY. However, the point which uniformly changes from the maximum value to the minimum value can be set to the bit synchronization point.

Figure 4C:
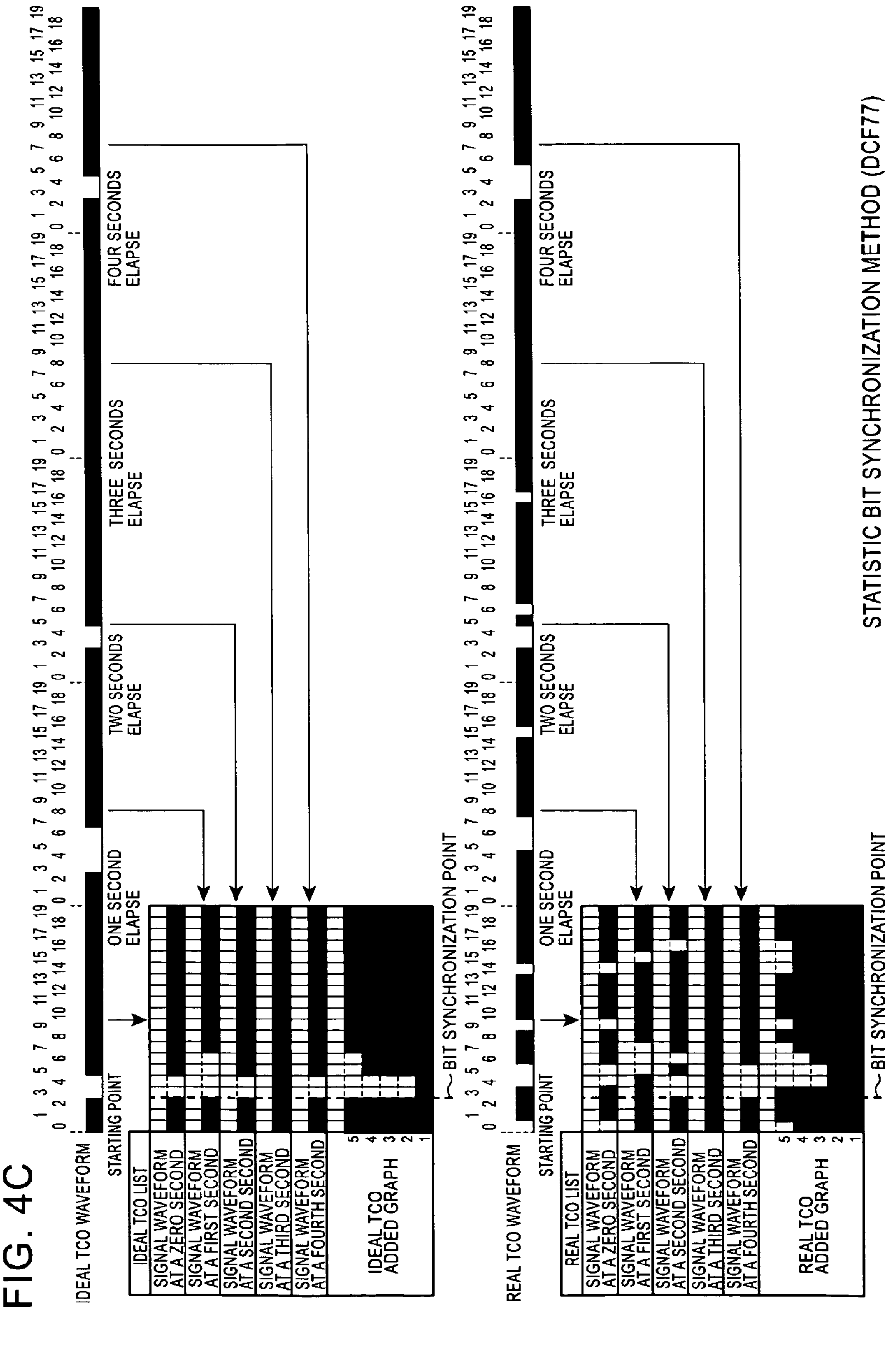
FIG. 4C explains a method of statistic bit synchronization for the standard radio wave DCF77.

FIG. 4C illustrates a method of a statistic bit synchronization for the standard radio wave DCF77. In DCF77, both the binary 0 and the binary 1 have "L" periods for 100 msec from the bit synchronization point. In addition, the adjustment marker which shows the beginning of a frame of 60 seconds represents “H” in the entire intervals. However, the adjustment marker has the appearance rate of one time for sixty seconds, and there will be little problem if the number of addition is increased. The point which uniformly changes from the maximum value to the minimum value can be set to the bit synchronization point as in the case of MSF.

Figure 4D:
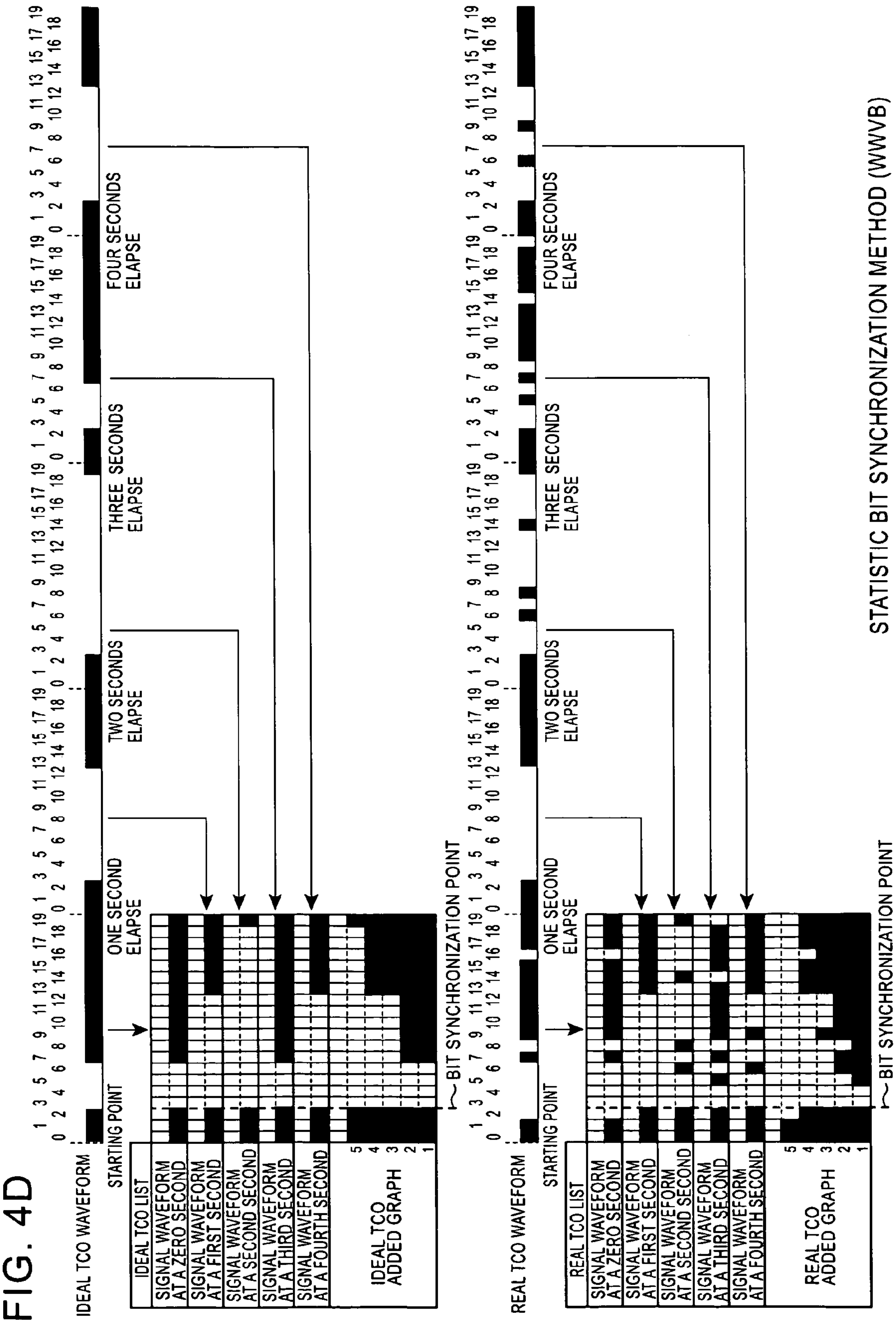
FIG. 4D explains a method of statistic bit synchronization for the standard radio wave WWVB

FIG. 4D illustrates a method of a statistic bit synchronization for the standard radio wave WWVB. In the case of WWVB, as any of a marker, a binary 0, and a binary 1 has “L” period for 200 msec from the bit synchronization point, the point which uniformly changes from the maximum value to the minimum value can be set to the bit synchronization point.

In the method of a statistic bit synchronization, as explained with reference to FIGS. 4A to 4D, added values are obtained. Then, regarding the target formats, the bit synchronization points is set to the falling edge from the maximum value to the minimum value in the case of MSF, DCF77, and WWVB, and the bit synchronization point is set to the rising edge from the minimum value to the maximum value in the case of JJY. Thus, at least a part of a bit waveform such as an edge part is extracted as a extracted signal, which gives effective means for detecting a bit synchronization for all formats. This makes it possible to solve the problem in the conventional method that a bit synchronization cannot be properly executed, since a steep edge is detected at the bit synchronization point even in a plurality of formats. In addition, a statistic bit synchronization function enables all formats to be bit-synchronized. Furthermore, it is highly possible that the method of a statistic bit synchronization can be used when similar formats for standard radio waves are specified in future.

The following explains the detail of the automatic channel selection process (Step S1) shown in FIG. 3 on the premise of use of the method for a statistic bit synchronization, which is a part of the present invention.

Figure 5A:
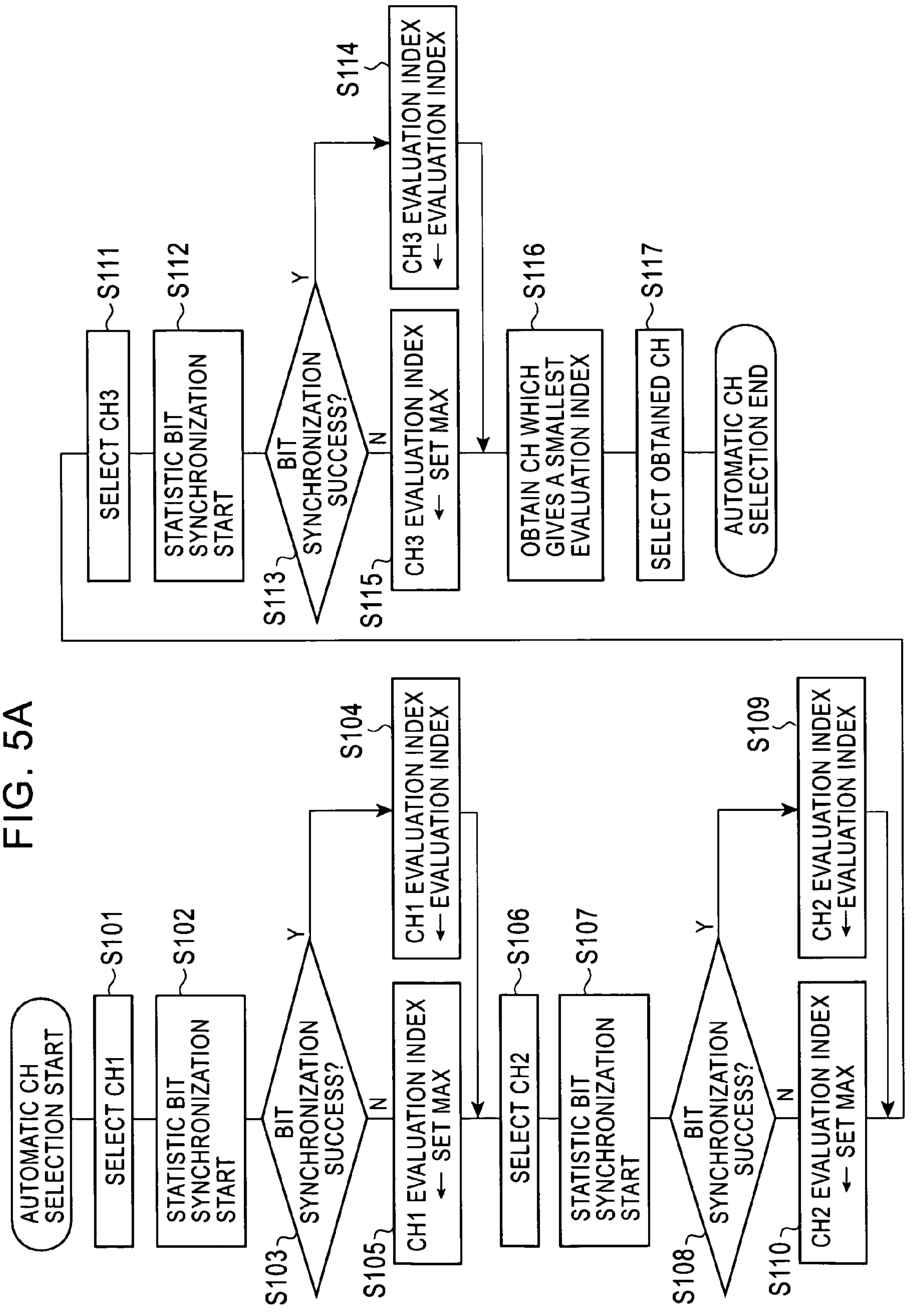
FIG. 5A is a flow chart showing a detailed processing procedure in an automatic channel selection.
Figure 5B:
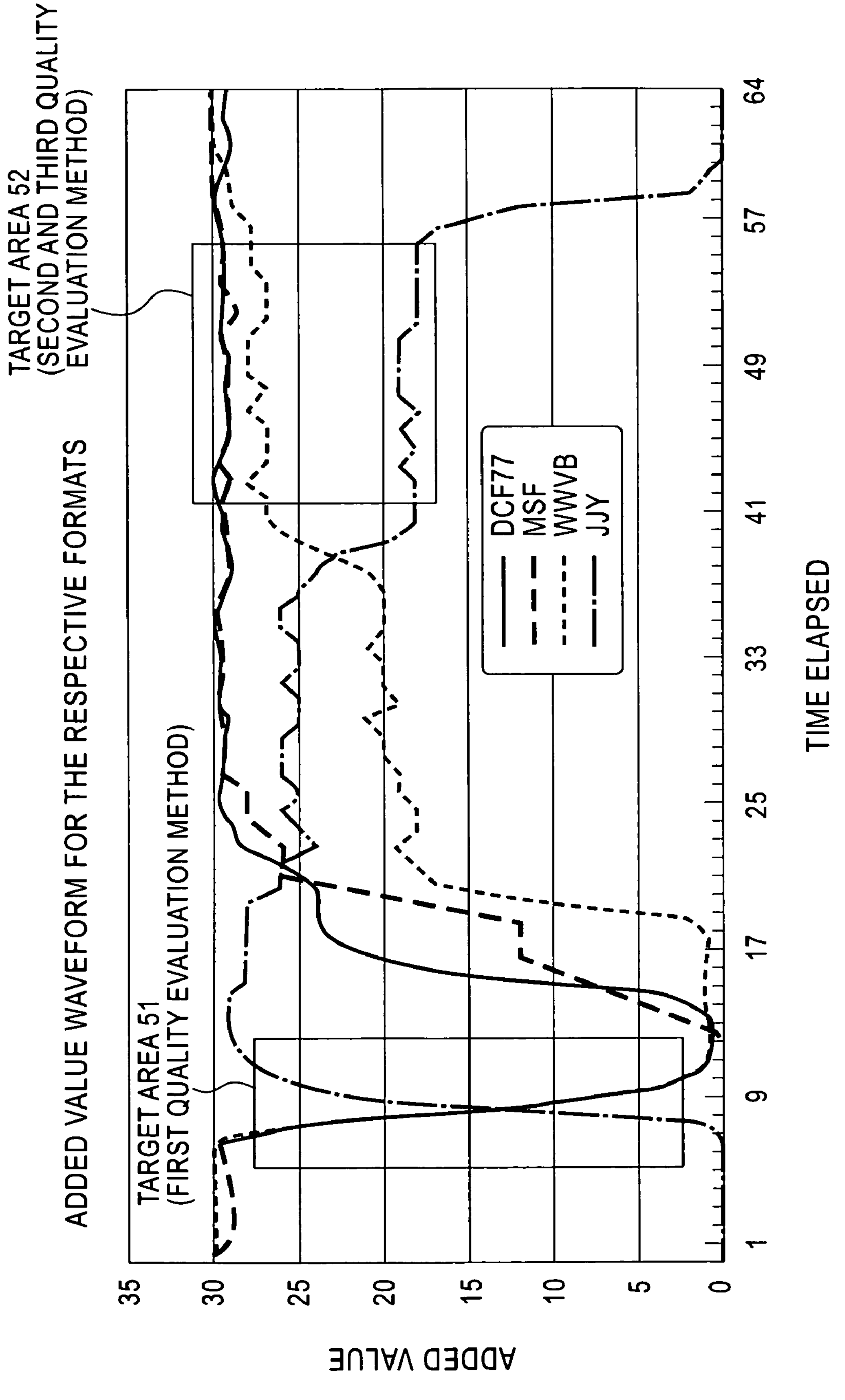
FIG. 5B is a graph showing an added value waveform for each format of the standard radio waves.

FIG. 5A shows the detail of a processing procedure for an automatic channel selection. The carrier frequency channels for the standard radio waves includes three channels corresponding to three frequencies of 40/60/77.5 kHz (refer to table 1). An automatic selection of the best frequency is achieved by switching the frequency to be selected among three channels by means of a hardware, evaluating the reception condition of the respective frequencies, comparing the evaluation result, and then selecting the best frequency in the receiving condition. FIG. 5B shows the respective waveforms of added value data in the standard radio waves of DCF77, WWVB, JJY and MSF. This figure teaches that all formats of MSF, DCF77, WWVB and JJY can be properly evaluated by using some evaluation methods in which an evaluation index to show whether a receiving condition is good is derived from either of target areas for evaluation, the target areas consisting of the target area 51 which represents an edge part changing to the maximum/minimum value and the target area 52 which represents a flat part of the waveform change in the added value waveforms for the respective standard radio waveforms after the bit synchronization has achieved.

In the processing procedure shown in FIG. 5A, the standard radio wave receiver firstly selects CH1 from three channels of 40 kHz/60 kHz/77.5 kHz, which respectively corresponds to CH1 to CH3 (Step S101). This enables an RF-detection of the signal from CH1 and a TCO signal is obtained. Then, the statistic bit synchronization is started for the TCO signal (Step S102). It is determined if bit synchronization has succeeded (Step S103). When the bit synchronization has succeeded, an evaluation result by any of some methods for evaluating a signal quality (refer to FIGS. 6A to 6G), which will be described later, is set to CH1 evaluation index (Step S104). In any of evaluation methods, a better evaluation result has a smaller evaluation index. Meanwhile, when it is determined that the bit synchronization has failed in Step S103, a MAX value is set to CH1 evaluation index as the worst evaluation value (Step S105).

Then, CH2 is processed with the similar procedures as S101 to S105 for CH1 (Step S106 to S110). CH3 is also processed with the same procedures (Step S111 to S115). The channel which gives the smallest (most excellent) evaluation index among the evaluation indexes for CH1 to CH3 is finally selected (Step S116 and S117). This allows the automatic channel selection in the best receiving condition.

The above-mentioned processing procedures allows a circuitry of a hardware to operate independent from the format of the standard radio wave. Thus, the problem that a channel selection has a some sort of limitation can be solved. The present embodiment shows the example in which one channel is selected among three channels. However, it is applicable not only to the case in which a wave clock has two channels, but also the case in which one channel is selected from more than 4 channels, and thus applicable to an increase of receiving channels for selection in future.

The following explains the details of the quality evaluation method for an added value waveform. The first, second and third quality evaluation methods respectively refer to FIGS. 6A and 6B, FIGS. 6C and 6D, and FIGS. 6E to 6G. The first quality evaluation method evaluates the target area 51 (refer to FIG. 5B) composed of an edge part changing to the maximum value and the minimum value in the waveform of the added value. The second and third quality evaluation methods evaluate the target area 52 (refer to FIG. 5B) composed of a flat part in the waveform of the added value.

Figure 6A:
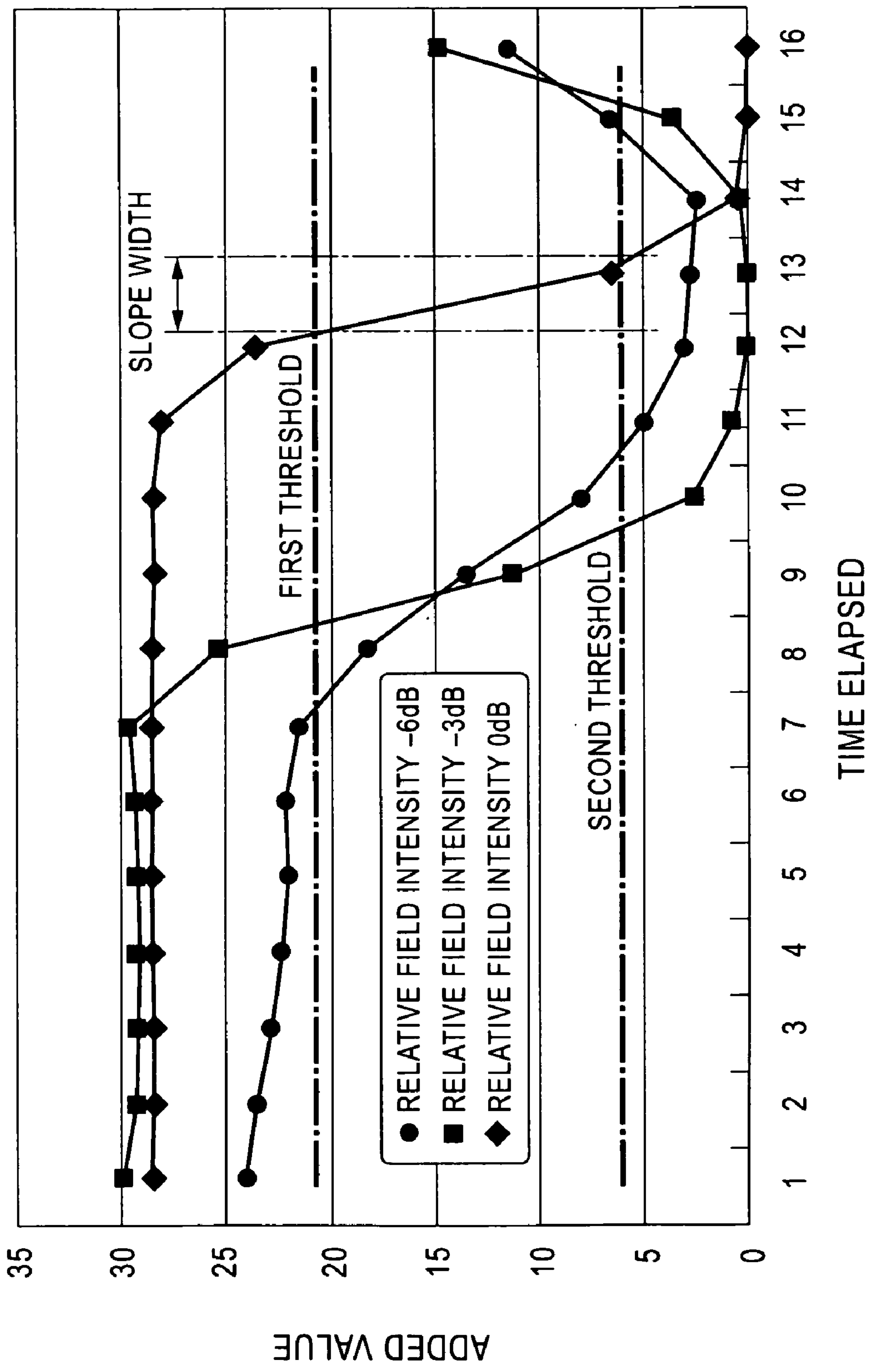
FIG. 6A is a graph showing an edge part with respect to time of the added value in the first quality evaluation method.

FIG. 6A explains the first quality evaluation method. In the figure, the X-axis represents a time axis of which scale indicates sampling points of the target area 51 within one second, that is, the 16 points when the sampling frequency is 64 Hz. The Y-axis represents the added value given by a listing of a TCO signal for 31 seconds, the listing being achieved by aligning the bit-synchronized TCO signals of the standard radio wave DCF77 every one second. The three line plots in the graph respectively show the three cases in which the relative field intensities are 0 dB μV/m, −3 dB μV/m and −6 dB μV/m. The field intensity of 0 dB μV/m represents a good condition having no error such as a spike caused by a noise in the reception. The waveforms of the two field intensities relatively positioned at −3 dB μV/m and −6 dB μV/m from the field intensity giving the above condition are also shown. The field intensity of −6 dB μV/m represents a condition near to the limit of the receivable field intensity.

When three different field intensities are compared with each other in the added value data used for an analysis of statistic bit synchronization in DCF77, it is understood that the degree of steep in the falling edge is increased, as the field intensity becomes high. This is because the higher field intensity has less fluctuation at the starting point of falling for every second and thus has less fluctuation caused by noise. By utilizing this property and by using the degree of steep in the slope, i.e., the gradient of the falling edge as an evaluation index, it is possible to evaluate the field intensity of a received signal which gives an added value. As a method for obtaining the degree of steep as a concrete numeric value, two thresholds of different values (the first and the second thresholds in the figure) are set, and a width between added values respectively crossing these threshold values is made to be a slope width, and the slope width is made to be the degree of steep. The slope widths actually measured in three cases of different field intensities are shown in the following table. Here, the slope width is represented by numbers on the sampling period unit (15.625 msec).

TABLE 2

| | Field intensity (dB) | | |
|---|---|---|---|
| | −6 | −3 | 0 |
| Slope width | 3.4 | 1.5 | 0.8 |

Figure 6B:
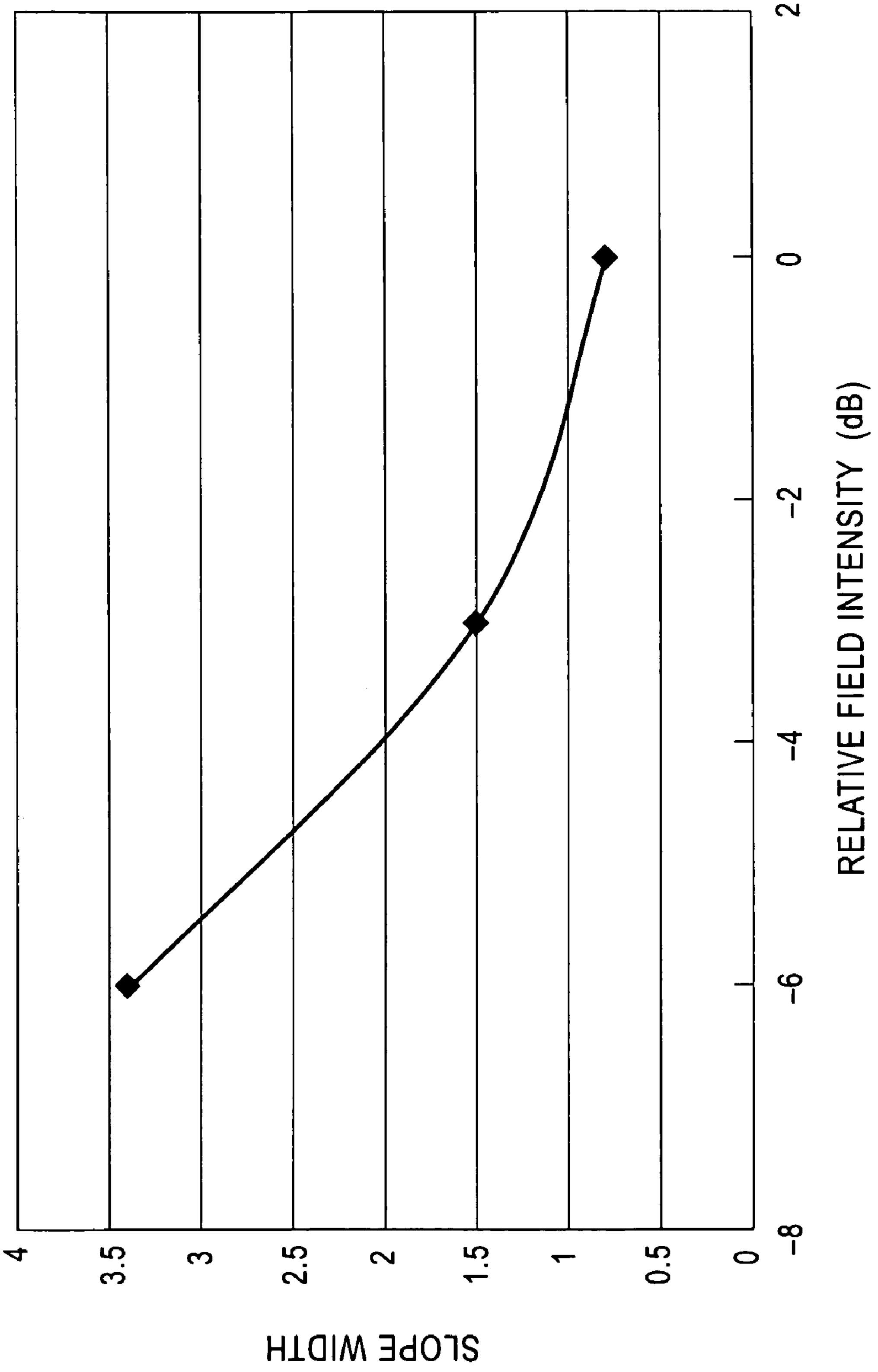
FIG. 6B is a graph showing a correlation between a slope width and an electric field intensity in the first quality determination method.

The graph of FIG. 6B shows the relation between a field intensity and a slope width. The relation in which the slope width varies depending on field intensity can be understood. In other words, a measurement of a slope width can be an index of a field intensity, i.e., a receiving condition. The index of a reception condition which measures a slope width can be obtained by processing a statistic bit synchronization. In addition, this is adaptable to all formats having a falling edge (MSF, DCF77 and WWVB). Even in the case of JJY, this can be also adapted by measuring an ascending edge.

In the case of an unknown format, the slope width is evaluated for both a rising and a falling edges. Thresholds are properly selected. At an edge which is not a bit synchronization point (an rising edge, in the case of DCF77), the degree of steep is lowered and a slope width is increased due to added values for segments in which codes are mixed. For this reason, it is determined that the slope width which is smaller in the rising edge and the falling edge is the bit synchronization point. In other word, the slope widths of the both edges are measured to obtain the smaller slope width so that the reception condition can be evaluated without depending on a format.

As the above-mentioned first quality evaluation method evaluates the degree of steep in the edge just after the bit synchronization point even in a plurality of formats, it can provide a reception evaluation index which allows a proper evaluation among a plurality of formats. In addition, the evaluation with a slope width can be an effective evaluation index for a reception condition regardless of format. In a conventional method, as an evaluation cannot be started till a bit decoding has completed and codes can be determined, it takes a time to start an evaluation. In addition, it is not possible to determine a receiving condition unless a type of format is known. However, by means of the evaluation for a reception condition according to the present embodiment, it is possible to evaluate a reception condition for an unknown format in the step of a bit synchronization.

In the above description of the first quality evaluation method, the evaluation method for DCF77 is mainly explained. It is noted that the same evaluation method can be used for the evaluation of a reception condition in MSF and WWVB, and that it is also usable for JJY by reversing a direction of an edge.

Figure 6C:
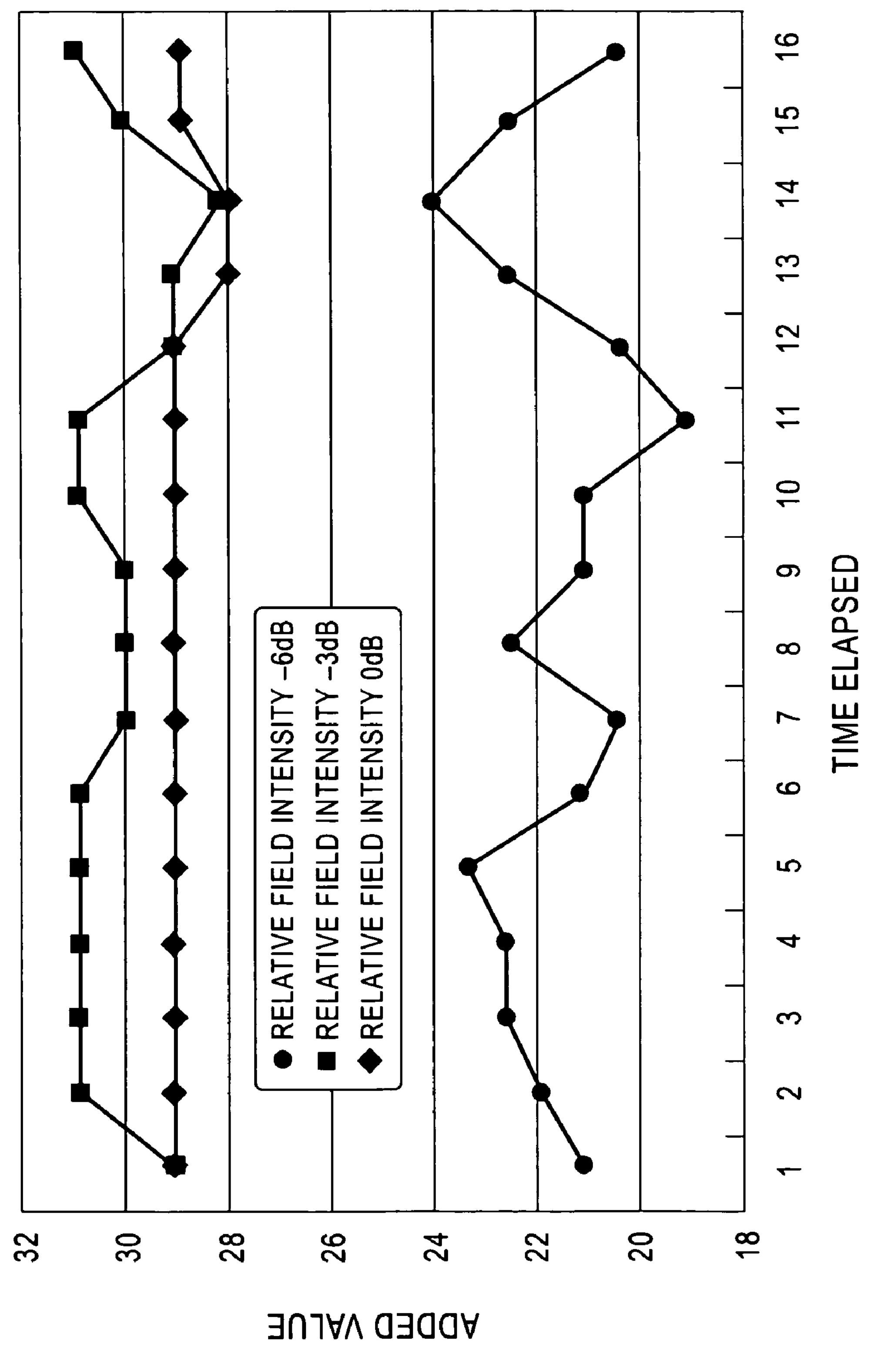
FIG. 6C is a graph showing a flat part of the added value with respect to time in the second quality determination method.

FIG. 6C explains the second quality evaluation method. In the figure, the X-axis represents a time axis of which scale indicates each sampling point of the target area 52 within one second, that is, the 16 points when the sampling frequency is 64 Hz. The Y-axis represents the added value given by a listing of a TCO signal for 31 seconds, the listing being achieved by aligning the bit-synchronized TCO signals of the standard radio wave DCF77 every one second. The three line plots in the graph respectively show the three cases in which the relative field intensities are 0 dB μV/m, −3 dB μV/m and −6 dB μV/m. The second evaluation method evaluates a fluctuation caused by noise in a flat part. The flat part is a part after a lapse of approximately 800 to 1000 msec from the bit synchronization point. The neighborhood of the part shows "H" in MSF, DCF77 and WWVB, and "L" in JJY. This section has no edge in any formats.

Compared with three different field intensities in the added value data used for an analysis of the statistic bit synchronization in the case of DCF77, ideally, the added value should be saturated at the maximum value. This is ensured in the graph of intensity of 0 dB. However, as the field intensity is lowered, great fluctuations are generated on the time axis of the added value which should be flat. This is caused by deterioration of SN due to a lowering of the field intensity. The second quality evaluation method sets this fluctuations to the evaluation index of a reception condition.

Figure 6D:
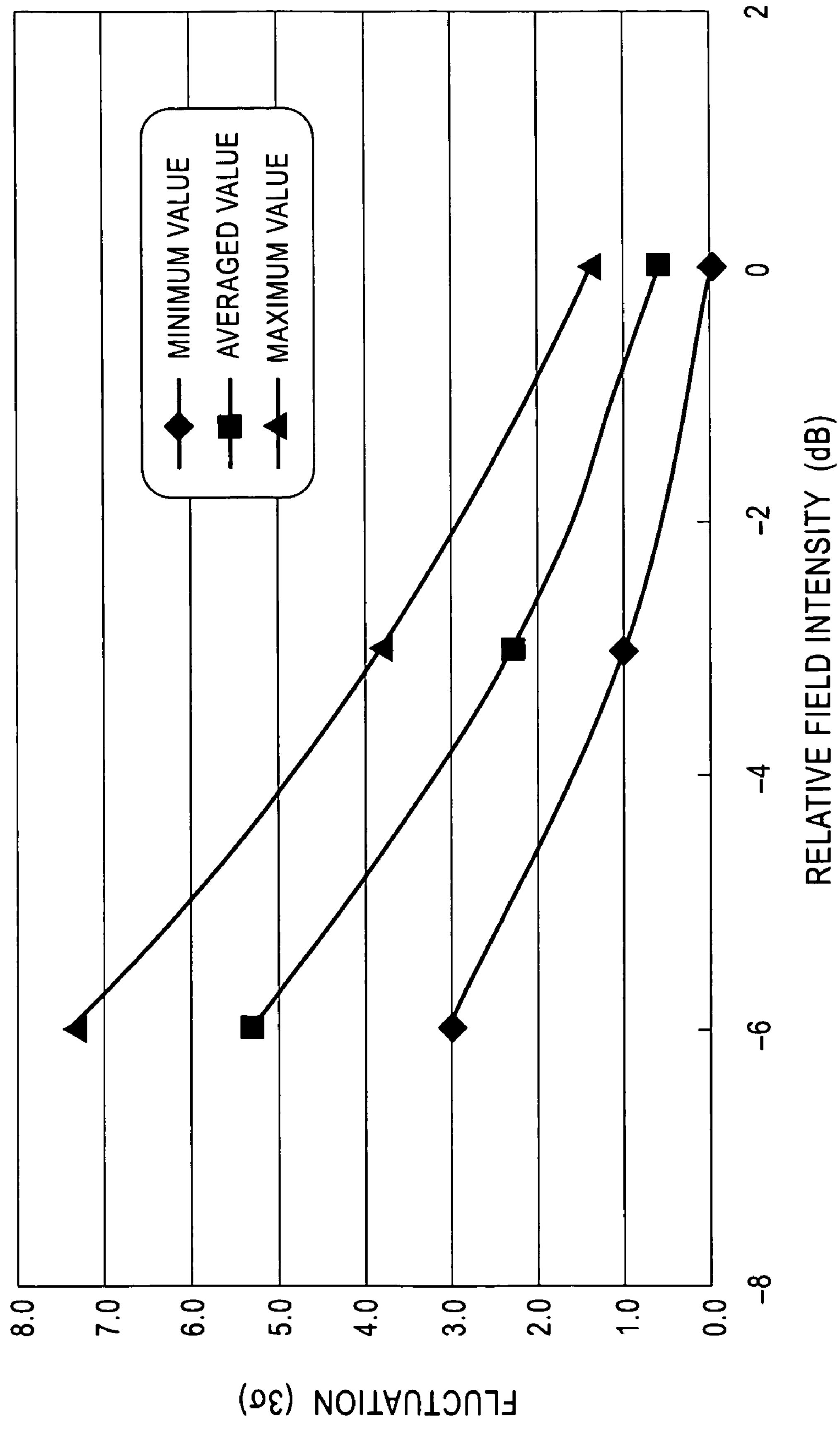
FIG. 6D is a graph showing a correlation of a standard deviation of the flat part and an electric field intensity in the second quality determination method.

To evaluate fluctuations can be achieved by obtaining a standard deviation (σ) regarding each added value in this section. For that, added value data for, for example, thirty seconds are recorded ten times so that 3σ for the added value is obtained, and then the minimum, averaged, and maximum values are calculated in the records for ten times. As clarified by the correlation between the fluctuations (3σ) and the field intensity, the fluctuation (3σ) shows a characteristic of monotonous reduction, and thus it is understood that it is good for the evaluation index of a reception condition. The results are shown in the table below. The results of averaging from the records for ten times for each of the field intensities are arranged in the table below. The graph in FIG. 6D shows the correlation between the standard deviation of the flat part and the field intensity.

TABLE 3

| | | Field intensity (dB) | | |
|---|---|---|---|---|
| | | −6 | −3 | 0 |
| 3σ | Minimum value | 3.1 | 1.0 | 0.0 |
| | Averaged value | 5.3 | 2.3 | 0.6 |
| | Maximum value | 7.4 | 3.8 | 1.4 |

As described above, as the second quality evaluation method evaluates fluctuations in a flat part even in a plurality of formats, it can be an effective evaluation index of a reception condition regardless of format, and it can provide a proper evaluation among a plurality of formats. The first quality evaluation method uses a degree of steep in an edge (a slope width) at the beginning of a bit synchronization as an evaluation index. It needs an evaluation having a higher accuracy of a digit than the sampling interval which has obtained slope widths (3.4, 1.5 or 0.8) in the first quality evaluation method, and it needs an arithmetic procedure for obtaining them from an added value waveform. However, as the second quality evaluation method evaluates fluctuations caused by noises in a flat part, it needs few arithmetic procedure and is not affected by a direction property of edge. Accordingly, the second quality evaluation method can provide a simpler evaluation than that of the first quality evaluation method.

Figure 6E:
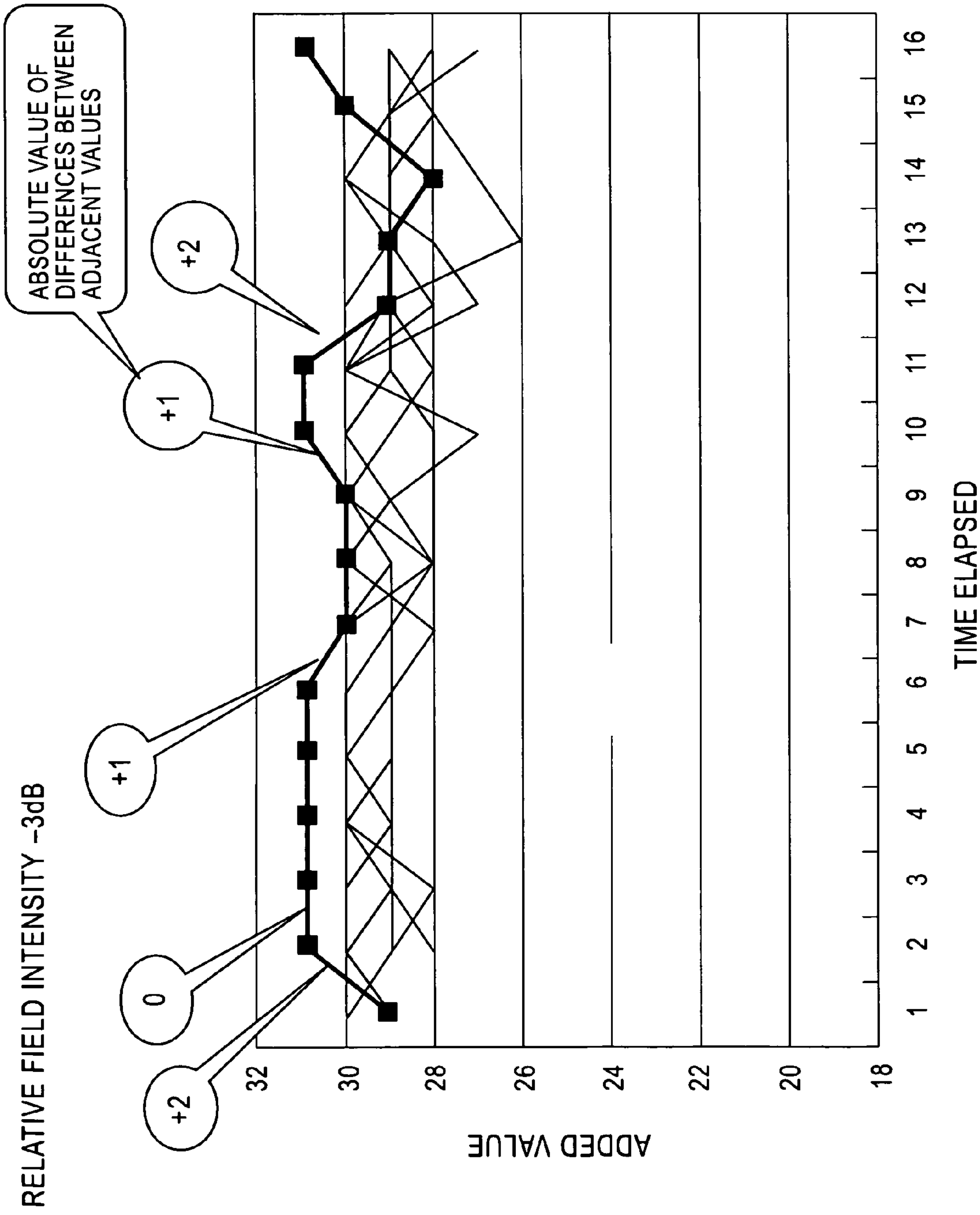
FIG. 6E is a graph showing a flat part of an additional value with respect to time and an adjacent difference with respect to time in the third quality determination method.

FIG. 6E explains the third quality evaluation method. In the figure, the X-axis represents a time axis of which scale indicates each sampling point of the target area 52 within one second, that is, the 16 points when the sampling frequency is 64 Hz, as in the second quality evaluation method. The Y-axis represents the added value given by a listing of a TCO signal for 31 seconds, the listing being achieved by aligning the bit-synchronized TCO signals of the standard radio wave DCF77 every one second. The line plots show the results of data measurements for ten times when the relative field intensity is −3 dB μV/m. The target area for evaluating the added value waveform used in the third quality evaluation method is a flat part in the added value waveform as in the second quality evaluation method. Instead of evaluating fluctuations of an added value with a standard deviation, the third quality evaluation method calculates a summation which adds up the absolute values in differences between adjacent added values on the time axis (hereinafter called adjacent difference summation).

FIG. 6F is a table showing the calculation results for the cases in which the relative field intensities are −3 dB μV/m, −6 dB μV/m and 0 dB μV/m. It should be noted that the adjacent difference summation becomes large, as the field intensity is lowered. This result is shown in the following table.

TABLE 4

| | | Field intensity (dB) | | |
|---|---|---|---|---|
| | | −6 | −3 | 0 |
| Adjacent difference summation | Minimum value | 11.0 | 3.0 | 0.0 |
| | Averaged value | 20.7 | 8.0 | 1.1 |
| | Maximum value | 27.0 | 17.0 | 3.0 |

Figure 6G:
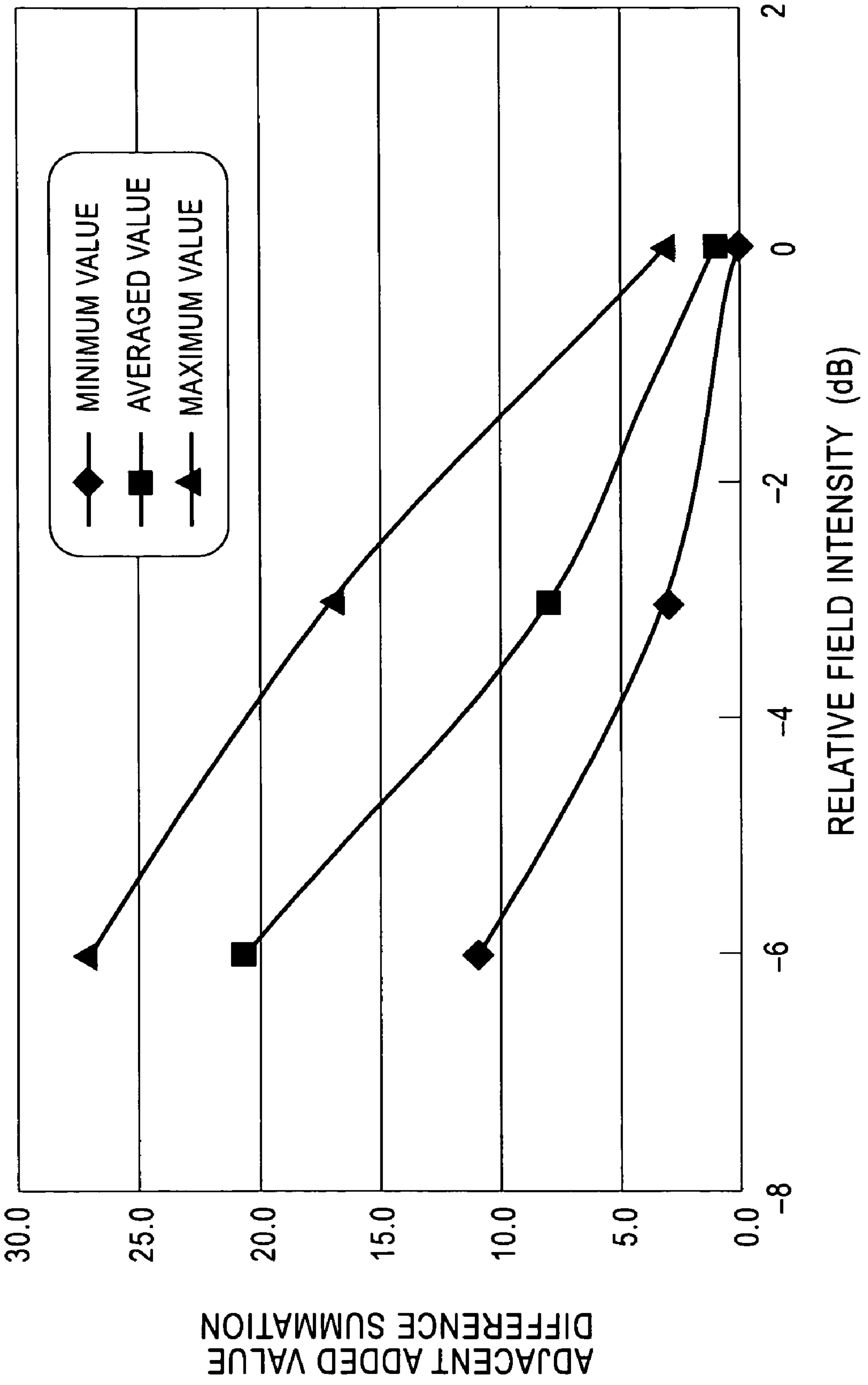
FIG. 6G is a graph showing a correlation between adjacent differences summation and a field intensity in the third quality evaluation method.

FIG. 6G shows a correlation between the adjacent difference summation and the field intensity. As it is apparent referring to the figure that the adjacent difference summation shows a monotonous reducing characteristic for the field intensity, and that it is good for an evaluation index of a reception condition.

The above-mentioned third quality evaluation method provides a simple method for evaluating fluctuations by obtaining a summation of absolute values of adjacent differences without using a standard deviation. This provide an effective evaluation index of a reception condition in any format. Moreover, it is suitable for a microcomputer having a little calculation ability and thus a little processing ability and it has a small consumption current, as fluctuations in a flat part is evaluated with a simple calculation even in a plurality of formats. Thus, it provide an optimum method for a decoder for a wave clock which operates at low speed. The second quality evaluation method also obtained an evaluation index using fluctuations of added values. However, as the calculation of a standard deviation in the second method needs a square calculation and a square root calculation and thus it has a high processing load, the second method is not suitable for a microcomputer having a low power. As the third quality evaluation method can provide an evaluation using only a deleting and adding, it is suitable for a microcomputer having a low power.

Figure 7A:
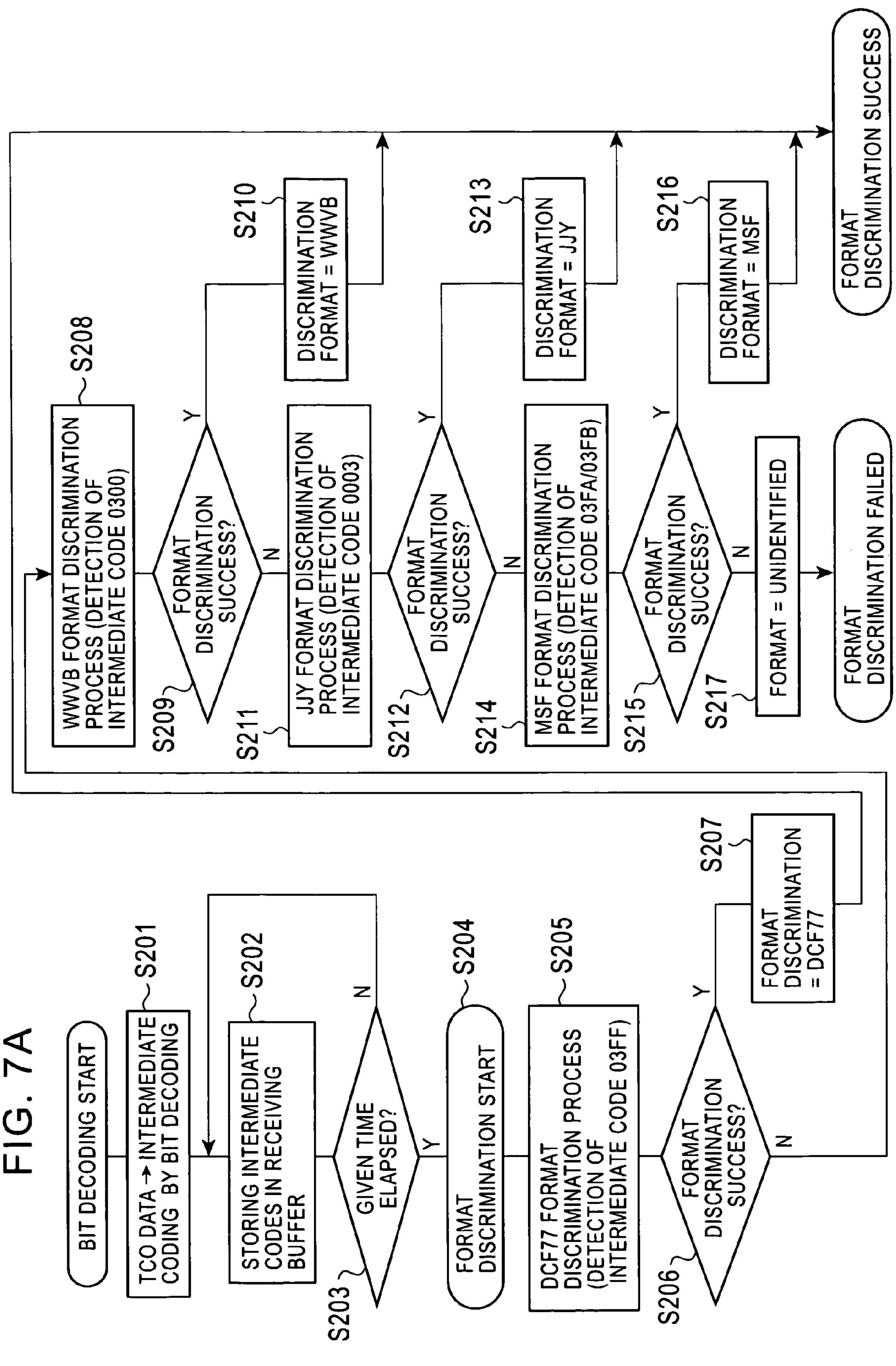
FIG. 7A is a flow chart showing a detailed processing procedure in an automatic format discrimination.
Figure 7B:
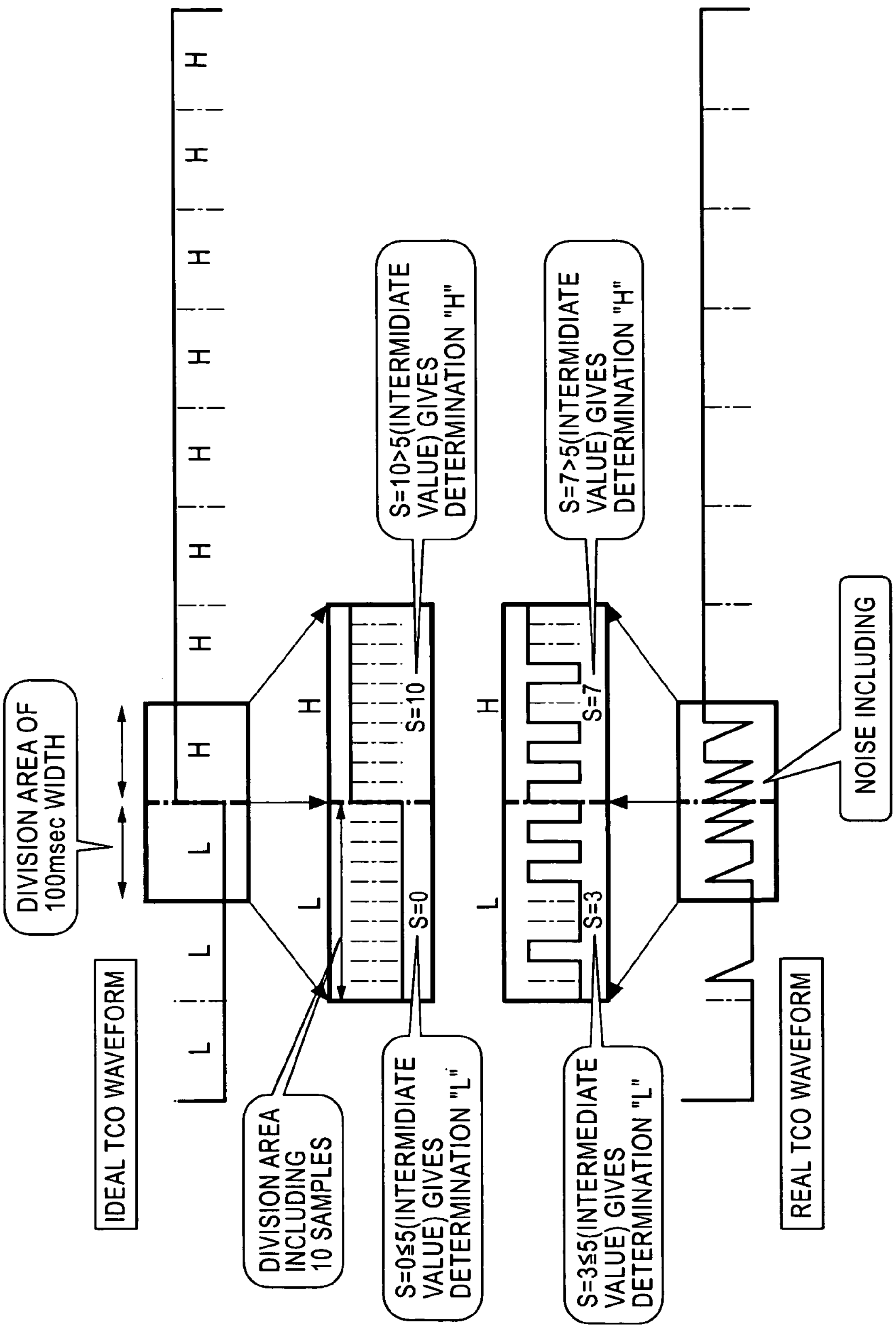
FIG. 7B is a diagram illustrating a method of an averaged bit decoding.
Figure 7C:
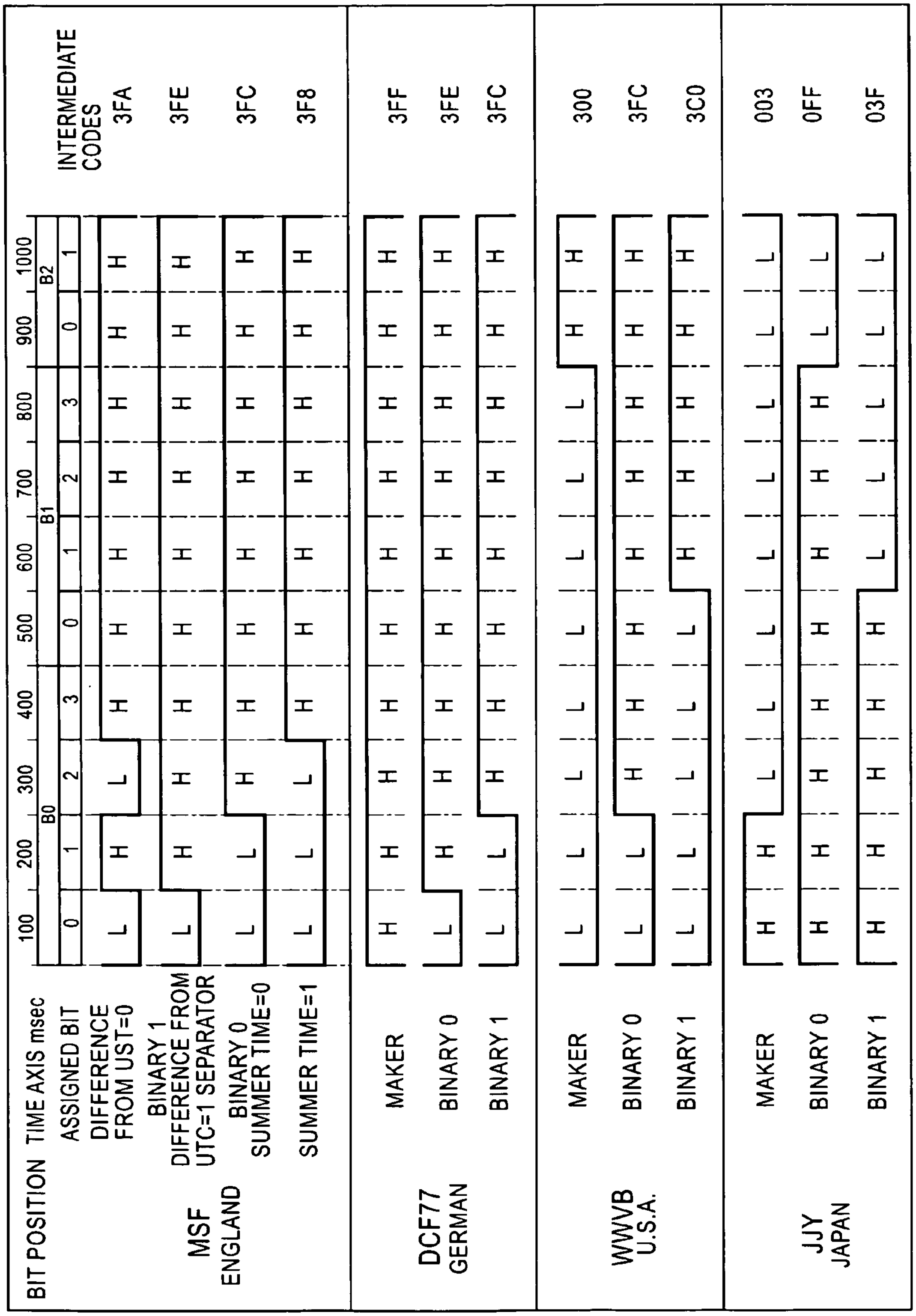
FIG. 7C is a diagram illustrating a correlation between a code waveform of a TCO signal and an intermediate code.

The following explains the details of an automatic format discrimination process. The automatic format discrimination process corresponds to Step 2 in the processing procedure shown in FIG. 3. FIG. 7A explains the details of the processing procedure for the automatic format discrimination. FIG. 7B explains the method for decoding averaged bits in a conversion from a TCO signal to an intermediates signal executed at the beginning of the automatic format discrimination process. FIG. 7C explains the relation of each code waveform with an intermediate signal in the TCO signal.

FIG. 7C shows a view of code waveforms of bit codes in the formats of MSF, DCF77, WWVB and JJY. As all formats allows code normalization by the unit of 100 msec, the codes are divided for the unit of 100 msec to determine "H"/"L" for each of division units. As a single code is represented by ten H/Ls, it would appear that the code consists of 10 bits. The "1 byte+2 bits" expressions with LSB fast are used in the figure (hexadecimal notation). The expressions can be set to intermediate codes. The intermediate codes allow various formats to be processed in a unified way, as respective codes such as a marker, a bit 0, and a bit 1 in respective formats are expressed by different numeric values.

FIG. 7B explains a method of bit decoding by area averaging. The method is directed to overcome the problem that a TCO waveform is distorted by a noise and that a bit decoding is not properly carried out. The method is achieved by counting the number of signals sampled with respect to a given part of 100 msec width, that is, an area and by decoding the number into either "H" or "L" by a majority based on the count results. For simplicity, the sampling frequency is set to 100 Hz in the figure, and the division area of 100 msec width includes ten samples of data.

In the division area, if the number of "H" data is expressed by S, S=0 to 10. If the number of "H" in the division area is more than that of "L" and the is 5 (=10/2), S>5. If the number of "L" is more than "H", S<=5. In other words, compared with the middle value 5, it is determined to be "H" in the case that S is bigger than 5, or it is determined to be "L" in the case that S is smaller than 5. "H"/"L" can be properly determined when there is few errors included.

Regarding the ideal TCO waveform shown in the upper part of the figure, the division area of S=10 is determined as "H" since S>5, the area of S=0 is determined as "L" since S<=5. Regarding the real TCO waveform shown in the lower part of the figure, in the TCO waveform to which a noise is mixed, the division area of S=3 is determined as "L" since S<5, and the division area of S=7 is determined as "L" since S<=5. Thus, the determination can be properly executed. This bit decoding method is referred to as "an area averaging" in this description.

The "area averaging" bit decoding method is summarized as follows; as the first step, a code waveform is divided into ten division areas by 100 msec from the bit starting point; as the second step, the number of "H" samples is counted in each division area to determines the area as "H" if it is bigger than the middle value or as "L" if it is equal to or smaller than the middle value; as the third step, one bit is assigned to each of the ten division areas to make an intermediate code of ten bits. By repeating this procedure for all bits, the intermediate code which does not depend on a format can be obtained.

The above-mentioned method of a bit decoding by area averaging can provide a proper bit decoding with highly against noise even if the TCO waveform is distorted by noise. In addition, the use of the intermediate code enables a bit decoding which does not depend on a format. Thus, if the number of formats are increased in future, it is possible to correspond the increased formats if they are defined in units of 100 msec.

Referring to FIG. 7A, the standard radio wave receiver executes an intermediate-code encoding with bit decoding by inputting the TCO signal which is selected and bit-synchronized according to the result of an automatic channel selection process (Step S201). Then, the intermediate code is stored in a receiving buffer of a RAM (Step S202). After the predetermined time (for example, four minutes corresponding to 60 seconds/data×four data) has elapsed (Step S203), a format discrimination for the stored intermediate code data is started (Step S204). The format discrimination means that a standard radio wave is determined and that its specification is discriminated.

Figure 8A:
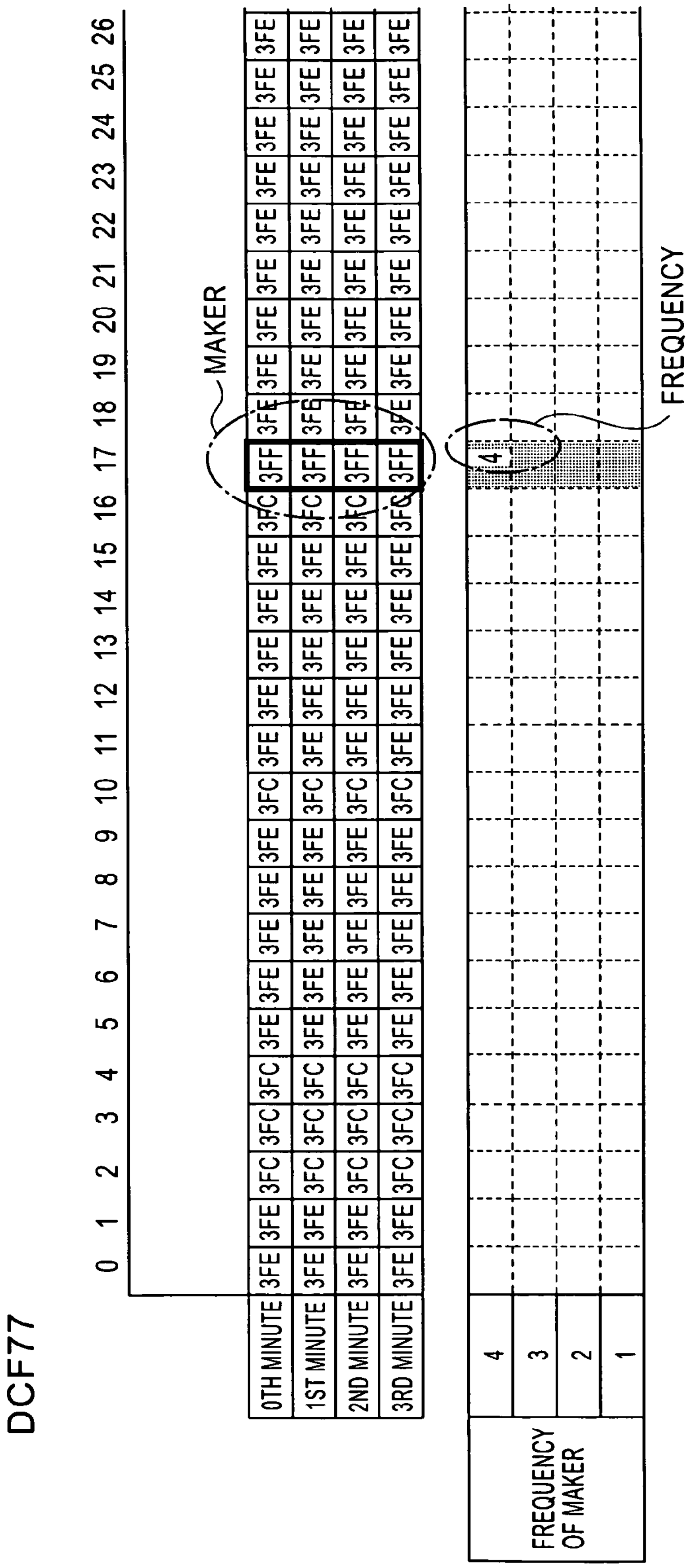
FIG. 8A is a diagram illustrating a method of a format discrimination process for the standard radio wave DCF77.

First, the standard radio wave receiver processes the DCF77 format discrimination process to determine if the intermediate code data is of DCF77 format (Step S205). Referring to FIG. 8A, DCF77 has a feature that a characteristic code is the marker found only at the only 59th-seconds. If the marker is detected at a specified position in the received data which has a period of one minute, it can be determined that the format is of DCF77. The marker of DCF77 is expressed by "03FF" with the intermediate codes. If a part corresponding to "03FF" is extracted from the received data, it can be clearly determined to be a marker. Here, for a correct discrimination, the received data for four minutes is sequentially assigned to the numbers of 0 to 59 from the head, and the frequency of the marker "03FF" for each number (position) is obtained. In this embodiment, the frequency of the marker position will be four, and it is clearly determined that the unknown format is of DCF77.

Referring to FIG. 7A again, when the standard radio wave receiver has determined that the discrimination is successfully executed with the above-mentioned DCF77 format discrimination process (Step S206), the discrimination format is set to "DCF77" (Step S207).

Figure 8B:
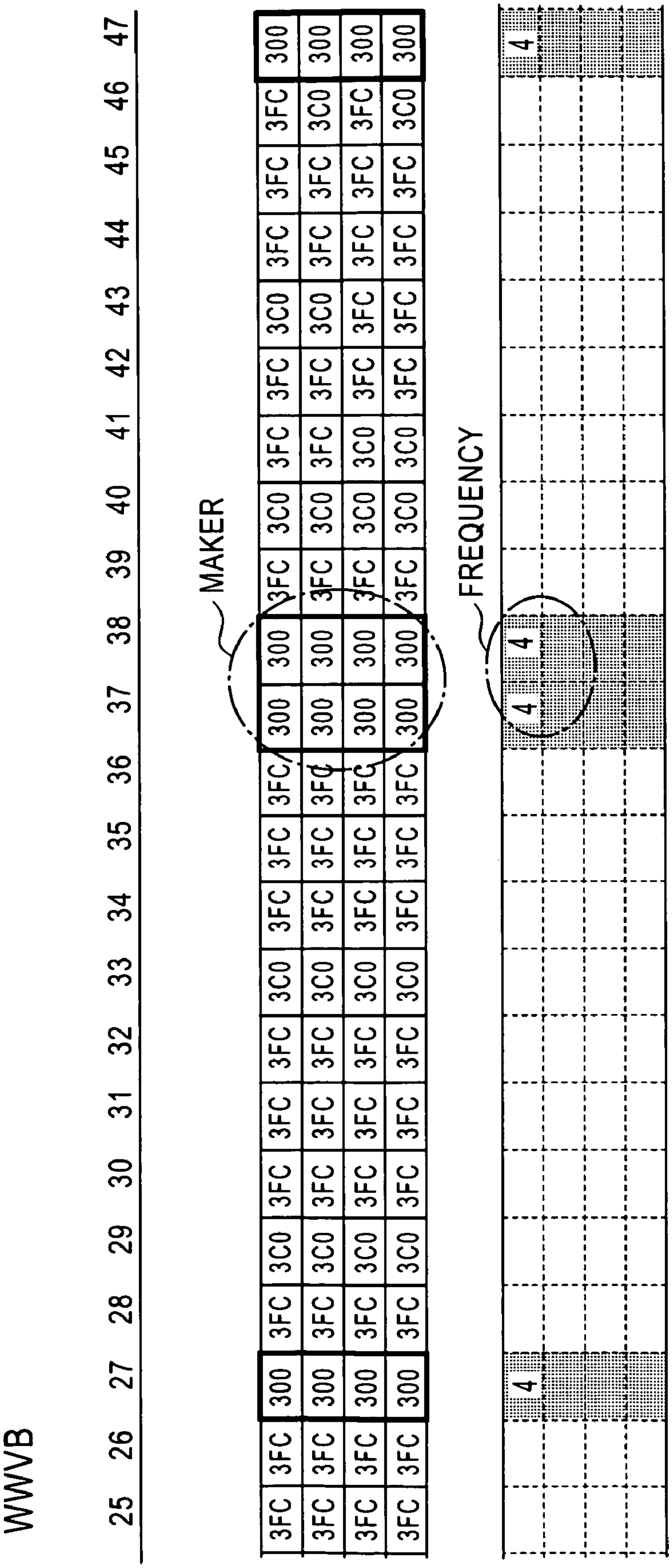
FIG. 8B is a diagram illustrating a method of a format discrimination process for the standard radio wave WWVB.
Figure 8C:
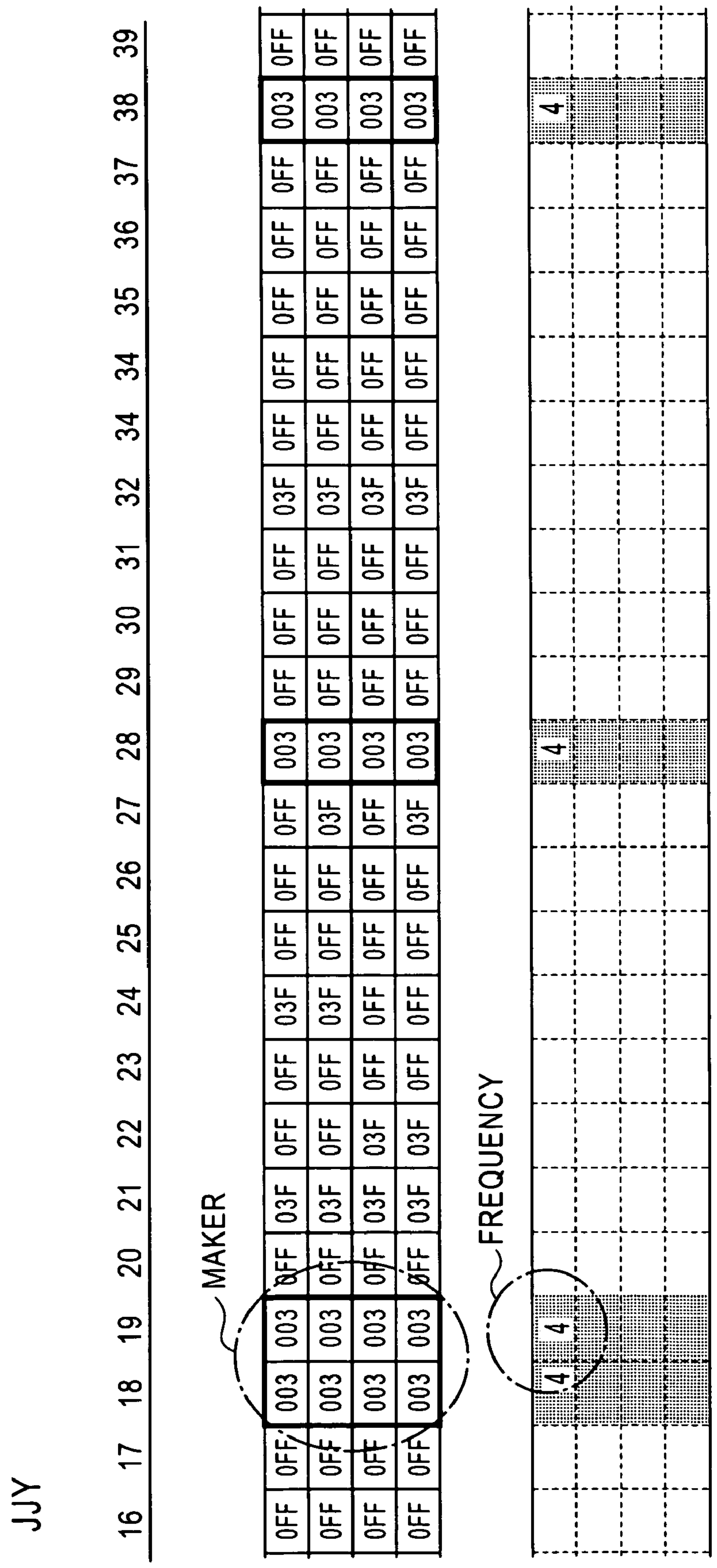
FIG. 8C is a diagram illustrating a method of a format discrimination process for the standard radio wave JJY.

Then, the standard radio wave receiver processes the WWVB format discrimination process to determine if the intermediate code data is of WWVB format (Step S208). Referring to FIGS. 8B and 8C and taking notice to WWVB and JJY, the both formats have features that position markers at every 10 seconds and an adjustment marker at the position of zero second are found as characteristic codes. The detection of the regularity of these position and adjustment markers allows to determine that the format is of WWVB or JJY. As WWVB and JJY have different bit formats for the marker and thus have different intermediate codes, they are not confused. The marker of WWVB is expressed by "0300" in its intermediate code. If the position corresponding to "0030" in the received data is noticed, it is clearly determined that they are position and adjustment markers. The frequency of marker position will be four, and it is clearly determined that the unknown format is of WWVB.

Referring to FIG. 7A again, when the standard radio wave receiver has determined that the discrimination is successfully executed with the above-mentioned WWVB format discrimination process (Step S209), the discrimination format is set to "WWVB" (Step S210).

Then, the standard radio wave receiver processes the JJY format discrimination process to determine if the intermediate code data is of JJY format (Step S211). Referring to FIG. 8C, the marker of JJY is expressed by "0003" in the intermediate code. If a part corresponding to "0003" is extracted from the received data, it can be clearly determined to be a position and an adjustment markers. The frequency at the marker position is four, and it is clearly determined that the unknown format is of JJY.

Referring to FIG. 7A again, when the standard radio wave receiver has determined that the determination is successfully executed with the above-mentioned JJY format discrimination process (Step S212), the discrimination format is set to "WWVB" (Step S213).

Figure 8D:
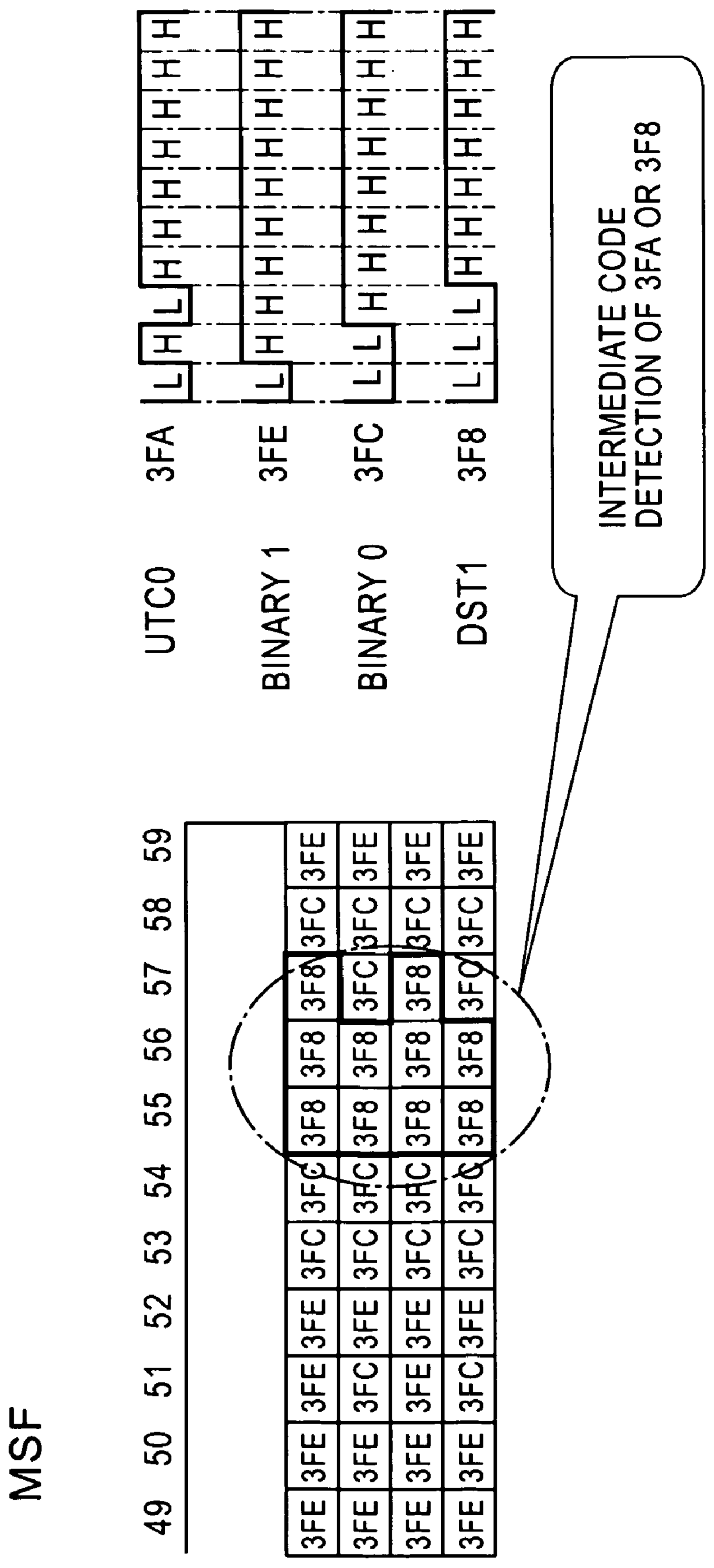
FIG. 8D is a diagram illustrating a method of a format discrimination process for the standard radio wave MSF.

Then, the standard radio wave receiver processes the MSF format discrimination process to determine if the intermediate code data is of MSF format (Step S214). Referring to FIG. 8D, MSF has no marker and thus no obvious feature. However, it has a bit format which is not found in DCF77, WWVB, and JJY. In other words, MSF has two characteristic codes; the format indicating the corresponding bit with UTC (hereinafter called UTC 0) and the format indicating one in the area of a parity to DST (hereinafter called DST1 for the sake of convenience). IF either of these formats is detected, it can be determined that the format is of MSF. UTC0 and DST1 of MSF are respectively expressed by "03FA" and "03F8". If parts corresponding to "03FA" and "03F8" are distinguished from the received data, only MSF can be detected and then discriminated.

Referring to FIG. 7 again, when the standard radio wave receiver has determined that the discrimination is successfully executed with the above-mentioned MSF format discrimination process (Step S215), the discrimination format is set to "MSF" (Step S216). On the contrary, if all of the format discrimination processes on the flow chart have resulted in failure in format discrimination, the discrimination format is set to "unidentified" (Step S217) and the process end.

To summarize the above-mentioned automatic format discrimination process, as each format has an appearance pattern of a characteristic code providing a feature which is not found in any other format, by detecting the appearance pattern in received data consisted of intermediate codes, the format can be determine which format of DCF77, WWVB, JJY and MSF it is. As the time for processing a software is vanishingly short in the whole time to obtain time data from a TCO signal in any format detection, the respective times required to detect respective formats of DCF77, WWVB, JJY and MSF are not changed. This enables a format selection to be executed in a short time. In addition, the automatic channel selection can select the best frequency channel, which enables a reception in the best receiving format.

It is clear from the above-mentioned embodiments that the decoding method and the standard radio wave receiver of the present invention solve the various problems; the problem in which a bit synchronization cannot be properly effected; the problem in which a bit decoding cannot be properly effected by a distortion of a TCO waveform caused by noise; the problem in which a channel selection has some limitation; the problem in which it takes a long time from an automatic selection of format to a successful reception; the problem in which a time for a successful reception is significantly different depending on a format; the problem in which it takes a long time to determine a failure of a reception; the problem in which there is no reception evaluation index which enables a proper evaluation among a plurality of formats; the problem in which a reception is not executed in the best reception format when a plurality of formats are in a receivable condition.

The above embodiments has explained equipment such as a clock which receives a standard radio wave and corrects and displays the inner time information as equipment which achieves the decoding method and accommodates the standard radio wave receiver of the present invention. However, the present invention is not limited to such equipment but can be applied to various control equipment and home electric appliances which perform a schedule operation.

The decoding method and the standard radio wave receiver provide a configuration which, by means of statistic bit synchronization, execute a bit synchronization, determine respective specifications regarding time code signals in respective carrier channels, then select a single channel with an evaluation index indicating good or bad of a reception condition for each carrier channel, and discriminate specifications from the time code signal of the selected channel by means of characteristics of respective formats which are different in respective specifications. This enables the standard radio wave in the channel of the best receiving condition to be automatically selected from various standard radio waves broadcast all over the world at less processing load and in less processing time and to be decoded in accordance with the specification of the format of the selected standard radio wave.

What is claimed is:

1. A decoding method for receiving a plurality of standard radio waves respectively having signal configurations in accordance with respective specifications which define carrier channels and formats and for decoding time code signals carried by said standard radio waves, comprising:

a bit synchronizing step of extracting at least part of a bit waveform common to said specifications as an extracted signal from a waveform of each of said time code signals given by each of said carrier channels, and of synchronizing each of said time code signals in terms of bit sequence in accordance with said extracted signal;

a channel selection step of determining an evaluation index indicating a good or bad reception condition for each of said carrier channels from said bit waveform, and of selecting a single channel from said carrier channels in accordance with said evaluation index;

a specification discrimination step of extracting a bit waveform corresponding to a characteristic code, which differs in each of said specifications, from the time code signal of said selected channel, and of determining a discriminated specification of the time code signal given by said channel in accordance with contents of said characteristic code; and a decoding step of decoding said time code signal to time data in accordance with the format of said discriminated specification;

wherein said bit synchronizing step is a step of extracting as said extracted signal an edge part of an added value waveform which is given by convolution-adding in every given bit period for sampling data obtained by sampling said time code signal in a sampling period smaller than said given bit period.

2. The decoding method according to claim 1, wherein said channel selection step measures a degree of steepness of said edge part, as said evaluation index in accordance with a correlation between the field intensity of each of said carrier channels and said degree of steepness.

3. The decoding method according to claim 1, wherein said channel selection step measures a slope width of said edge part, as said evaluation index in accordance with a correlation between the field intensity of each of said carrier channel and the slope width defined by said degree of steepness.

4. The decoding method according to claim 1, wherein said channel selection step measures a fluctuation in a flat part of the waveform which does not include said edge part, as said evaluation index in accordance with a correlation between the field intensity of each of said carrier channel and said fluctuation.

5. The decoding method according to claim 4, wherein said channel selection step uses a standard deviation on a time axis in said added value as an index indicating a magnitude of said fluctuation.

6. The decoding method according to claim 4, wherein said channel selection step uses a summation of absolute values of differences of adjacent added values on the time axis in said added values as an index indicating a magnitude of said fluctuation.

7. The decoding method according to claim 1, wherein said specification discrimination step further includes a step of decoding said time code signal in accordance with a bit waveform corresponding to each code of the different format in each of said specifications into intermediate codes, each of said intermediate codes is unique over said specifications.

8. The decoding method according to claim 1, wherein said characteristic code is a marker code indicating a frame position in the format which differs over said specifications.

9. The decoding method according to claim 7, said step of decoding to the intermediate code includes a step of repeating a level determination step for all bits of said time code signal, said level determination step comprising:

dividing said added value waveform into a plurality of parts in time axis; and determining either “H ” or “L ” level wherein “H ” represents a high level and “L ” represents a low level for each of said plurality of parts using majority decision.

10. A standard radio wave receiver for receiving a plurality of standard radio waves respectively having signal configurations in accordance with respective specifications which define carrier channels and formats and for decoding time code signals carried by said standard radio waves, comprising:

bit synchronizing means to extract at least part of a bit waveform common to said specifications as a extracted signal from a waveform of each of said time code signals given by each of said carrier channels, and to synchronize bits to each of said time code signals in accordance with said extracted signal;

channel selection means to determine an evaluation index indicating a good or had reception condition for each of said carrier channels from said bit waveform, and to select a single channel from said carrier channels in accordance with said evaluation index;

specification discrimination means to extract a bit waveform corresponding to a characteristic code which characterizes said format different in each of said specifications from said time code signal of said selected channel, and to discriminate said specification of said time code signal given by said channel in accordance with the contents of said characteristic code; and decoding means to decode said time code signal to time data in accordance with the format of said discriminated specification;

wherein said bit synchronizing means is configured to extract as said extracted signal an edge part of an added value waveform which is given by convolution-adding in every given bit period for sampling data obtained by sampling said time code signal in a sampling period smaller than said given bit period.

11. A standard radio wave receiving circuit for receiving a plurality of standard radio waves respectively having signal configurations in accordance with respective specifications which define carrier channels and formats and for decoding time code signals carried by said standard radio waves, comprising:

a bit synchronizing part to extract at least part of a bit waveform common to said specifications as a extracted signal from a waveform of each of said time code signals given by each of said carrier channels, and to synchronize bits to each of said time code signals in accordance with said extracted signal;

a channel selection part to determine an evaluation index indicating a good or bad reception condition for each of said carrier channels from said bit waveform, and to select a single channel from said carrier channels in accordance with said evaluation index;

a specification discrimination part to extract a bit waveform corresponding to a characteristic code which characterizes said format different in each of said specifications from said time code signal of said selected channel, and to discriminate said specification of said time code signal given by said channel in accordance with the contents of said characteristic code; and a decoding part to decode said time code signal to time data in accordance with the format of said discriminated specification;

wherein said bit synchronizing part is a part configured to extract as said extracted signal an edge part of an added value waveform which is given by convolution-adding in every given bit period for sampling data obtained by sampling said time code signal in a sampling period smaller than said given bit period.

* * * * *